US012483825B2

(12) United States Patent
Zhang et al.

(10) Patent No.: US 12,483,825 B2
(45) Date of Patent: Nov. 25, 2025

(54) ACOUSTIC OUTPUT APPARATUS

(71) Applicant: SHENZHEN SHOKZ CO., LTD., Guangdong (CN)

(72) Inventors: Lei Zhang, Shenzhen (CN); Zhen Wang, Shenzhen (CN); Liwei Wang, Shenzhen (CN); Peigeng Tong, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 258 days.

(21) Appl. No.: 18/314,798

(22) Filed: May 9, 2023

(65) Prior Publication Data

US 2023/0276178 A1 Aug. 31, 2023

Related U.S. Application Data

(63) Continuation of application No. PCT/CN2021/095304, filed on May 21, 2021.

(30) Foreign Application Priority Data

Apr. 9, 2021 (CN) ......................... 202110383452.2

(51) Int. Cl.
*H04R 1/28* (2006.01)
*H04R 1/02* (2006.01)
(Continued)

(52) U.S. Cl.
CPC ........... *H04R 1/2811* (2013.01); *H04R 1/023* (2013.01); *H04R 1/1008* (2013.01);
(Continued)

(58) Field of Classification Search
CPC .... H04R 1/2811; H04R 1/023; H04R 1/1008; H04R 1/1075; H04R 1/2826; H04R 1/345;
(Continued)

(56) References Cited

U.S. PATENT DOCUMENTS 8,126,185 B1 * 2/2012 Dai .......................... H04R 7/18 381/386
10,848,878 B2 11/2020 Qi et al.
(Continued)

FOREIGN PATENT DOCUMENTS

CN 2452234 Y 10/2001
CN 101931837 A 12/2010
(Continued)

OTHER PUBLICATIONS

The Extended European Search Report in European Application No. 21935677.1 mailed on Apr. 4, 2024, 7 pages.
(Continued)

*Primary Examiner* — Tuan D Nguyen
(74) *Attorney, Agent, or Firm* — METIS IP LLC

(57) ABSTRACT

The present disclosure provides an acoustic output apparatus. The acoustic output apparatus may include a bone-conduction acoustic assembly, an air-conduction acoustic assembly, and a housing. The bone-conduction acoustic assembly may be configured to generate bone-conduction sound waves. The air-conduction acoustic assembly may be configured to generate air-conduction sound waves. The housing may include an accommodating chamber configured to accommodate the bone-conduction acoustic assembly and the air-conduction acoustic assembly. At least a portion of the housing may be in contact with a user's skin to transmit the bone-conduction sound waves under an action of the bone-conduction acoustic assembly. The air-
(Continued)

conduction sound waves may be generated based on vibrations of at least one of the housing or the bone-conduction acoustic assembly when the bone-conduction sound waves are generated.

20 Claims, 12 Drawing Sheets

(51) Int. Cl.

| | |
|---|---|
| ***H04R 1/10*** | (2006.01) |
| ***H04R 1/34*** | (2006.01) |
| ***H04R 1/40*** | (2006.01) |
| ***H04R 7/12*** | (2006.01) |
| ***H04R 9/02*** | (2006.01) |
| ***H04R 9/04*** | (2006.01) |
| ***H04R 9/06*** | (2006.01) |
| ***H04R 23/02*** | (2006.01) |

(52) U.S. Cl.
CPC ......... *H04R 1/1075* (2013.01); *H04R 1/2826* (2013.01); *H04R 1/345* (2013.01); *H04R 1/406* (2013.01); *H04R 7/12* (2013.01); *H04R 9/025* (2013.01); *H04R 9/045* (2013.01); *H04R 9/06* (2013.01); *H04R 23/02* (2013.01); *H04R 1/1041* (2013.01); *H04R 2460/11* (2013.01); *H04R 2460/13* (2013.01)

(58) Field of Classification Search
CPC .......... H04R 1/406; H04R 7/12; H04R 9/025; H04R 9/045; H04R 9/06; H04R 23/02; H04R 1/1041; H04R 2460/11; H04R 2460/13; H04R 1/2849; H04R 25/606; H04R 31/003; H04R 9/066; H04R 1/1016; H04R 1/1083; H04R 5/0335; H04R 2400/03; H04R 1/10
See application file for complete search history.

(56) References Cited

U.S. PATENT DOCUMENTS

| | | | |
|---|---|---|---|
| 2017/0118563 | A1 | 4/2017 | Maas |
| 2017/0164088 | A1 | 6/2017 | Fukuda |
| 2020/0045397 | A1 | 2/2020 | Wu et al. |
| 2021/0067858 | A1 | 3/2021 | Struzik |
| 2021/0076123 | A1 | 3/2021 | Zhang et al. |

FOREIGN PATENT DOCUMENTS

| | | | |
|---|---|---|---|
| CN | 204069258 | U | 12/2014 |
| CN | 105959848 | A | 9/2016 |
| CN | 106937222 | A | 7/2017 |
| CN | 110730410 | A | 1/2020 |
| CN | 111182426 | A | 5/2020 |
| CN | 111954142 | A | 11/2020 |
| CN | 214708013 | U | 11/2021 |
| JP | H05176392 | A | 7/1993 |
| JP | 2000217192 | A | 8/2000 |
| JP | 2007288689 | A | 11/2007 |
| KR | 102115387 | B1 | 5/2020 |
| KR | 20210018001 | A | 2/2021 |
| WO | 2007083903 | A1 | 7/2007 |
| WO | 2018079340 | A1 | 5/2018 |

OTHER PUBLICATIONS

Notice of Reasons for Rejection in Japanese Application No. 2023-540162 mailed on Sep. 2, 2024, 11 pages.
International Search Report in PCT/CN2021/095304 mailed on Jan. 6, 2022, 6 pages.
Notice of Preliminary Rejection in Korean Application No. 10-2023-7021161 mailed on Jul. 30, 2025, 14 pages.

* cited by examiner

ACOUSTIC OUTPUT APPARATUS

CROSS-REFERENCE TO RELATED APPLICATIONS

This application is a continuation of International Application No. PCT/CN2021/095304, filed on May 21, 2021, which claims priority to Chinese Patent Application No. 202110383452.2, filed on Apr. 9, 2021, and the entire contents of each of which are hereby incorporated by reference.

TECHNICAL FIELD

The present disclosure relates to the field of acoustics, and in particular, to acoustic output apparatus.

BACKGROUND

With the gradual popularization of electronic devices, people have increasing requirements for electronic devices. Electronic devices such as headphones need to be comfortable to wear and have good acoustic performance. Therefore, it is desirable to provide an acoustic output apparatus with improved acoustic performance.

SUMMARY

The embodiments of the present disclosure provide an acoustic output apparatus. The acoustic output apparatus may include a bone-conduction acoustic assembly configured to generate bone-conduction sound waves; an air-conduction acoustic assembly configured to generate air-conduction sound waves; and a housing including an accommodating chamber configured to accommodate the bone-conduction acoustic assembly and the air-conduction acoustic assembly, wherein at least a portion of the housing may be in contact with a user's skin to transmit the bone-conduction sound waves under an action of the bone-conduction acoustic assembly; and the air-conduction sound waves may be generated based on vibrations of at least one of the housing or the bone-conduction acoustic assembly when the bone-conduction sound waves are generated.

In some embodiments, the bone-conduction acoustic assembly may include a transducer device, and the transducer device may include: a magnetic circuit assembly configured to generate a magnetic field; a vibration plate connected to the housing; and a voice coil connected to the vibration plate, wherein the voice coil may vibrate in the magnetic field in response to a sound signal, and drive the vibration plate to vibrate to generate the bone-conduction sound waves.

In some embodiments, the air-conduction acoustic assembly may include a diaphragm connected to at least one of the bone-conduction acoustic assembly or the housing, and the vibrations of the at least one of the bone-conduction acoustic assembly or the housing may drive the diaphragm to generate the air-conduction sound waves.

In some embodiments, the accommodating chamber may include a first cavity and a second cavity separated by the diaphragm, wherein a first portion of the housing may form the first cavity and may be connected to the bone-conduction acoustic assembly to transmit the bone-conduction sound waves; and a second portion of the housing may form the second cavity and may include one or more sound holes in communication with the second cavity, and the air-conduction sound waves may be guided out from the housing through the one or more sound holes.

In some embodiments, a frequency response curve of the bone-conduction sound waves may include at least one resonance peak, the at least one resonance peak may have a first resonance frequency when the diaphragm is connected to the bone-conduction acoustic assembly and the housing, the at least one resonance peak may have a second resonance frequency when the diaphragm is disconnected from the at least one of the bone-conduction acoustic assembly or the housing, and a ratio of an absolute value of a difference between the first resonance frequency and the second resonance frequency to the first resonance frequency may be less than or equal to 50%.

In some embodiments, the first resonance frequency may be less than or equal to 500 Hz.

In some embodiments, the absolute value of the difference between the first resonance frequency and the second resonance frequency may be in a range of 0 Hz-50 Hz.

In some embodiments, the diaphragm may include an annular structure, an inner wall of the diaphragm may surround the bone-conduction acoustic assembly, and an outer wall of the diaphragm may be connected to the housing.

In some embodiments, the diaphragm may include: a first connection part surrounding the bone-conduction acoustic assembly and connected to the bone-conduction acoustic assembly; a second connection part connected to the housing; and a wrinkle part connecting the first connection part and the second connection part.

In some embodiments, the first connection part, the second connection part, and the wrinkle part may be integrally formed.

In some embodiments, the wrinkle part may include at least one of a convex region or a concave region.

In some embodiments, the concave region may be sunken towards the second cavity.

In some embodiments, the concave region may have a first depth, a first spacing distance may be between the first connection part and the second connection part, and a ratio of the first depth to the first spacing distance may be in a range of 0.2-1.4.

In some embodiments, the concave region may have a half-depth width at a half-depth of the first depth, and a ratio of the half-depth width to the first spacing distance may be in a range of 0.2-0.6.

In some embodiments, there may be a first projection distance between a first connection point and a second connection point along a vibration direction of the bone-conduction acoustic assembly, the first connection point may be a connection point between the wrinkle part and the first connection part, the second connection point may be a connection point between the wrinkle part and the second connection part, and a ratio of the first projection distance to the first spacing distance may be in a range of 0-1.8.

In some embodiments, the wrinkle part may include: a first transition segment, one end of the first transition segment being connected to the first connection part; a second transition segment, one end of the second transition segment being connected to the second connection part; a third transition segment, one end of the third transition segment being connected to the other end of the first transition segment; a fourth transition segment, one end of the fourth transition segment being connected to the other end of the second transition segment; and a fifth transition segment, two ends of the fifth transition segment being connected to the other end of the third transition segment and the other end of the fourth transition segment, respectively, wherein in a direction from a connection point between the first transition segment and the first connection part to a vertex of the wrinkle part, an included angle between a tangent line of a side of the first transition segment facing the concave region and the vibration direction of the bone-conduction acoustic assembly may decrease gradually, and an included angle between a tangent line of a side of the third transition segment facing the concave region and the vibration direction of the bone-conduction acoustic assembly may remain constant or increase gradually; and in a direction from a connection point between the second transition segment and the second connection part to the vertex, an included angle between a tangent line of a side of the second transition segment facing the concave region and the vibration direction of the bone-conduction acoustic assembly may decrease gradually, and an included angle between a tangent line of a side of the fourth transition segment facing the concave region and the vibration direction of the bone-conduction acoustic assembly may remain constant or increase gradually.

In some embodiments, in a direction perpendicular to the vibration direction of the bone-conduction acoustic assembly, the first transition segment, the second transition segment, and the fifth transition segment may have a first projection length, a second projection length, and a third projection length, respectively, and a ratio of a sum of the first projection length and the second projection length to the third projection length may be in a range of 0.4-2.5.

In some embodiments, the first transition segment may have a shape of an arc, and a radius of the arc may be greater than or equal to 0.2 mm.

In some embodiments, the second transition segment may have a shape of an arc, and a radius of the arc may be greater than or equal to 0.3 mm.

In some embodiments, the fifth transition segment may have a shape of an arc, and a radius of the arc may be greater than or equal to 0.2 mm.

In some embodiments, the air-conduction acoustic assembly may further include a reinforcing member, and the second connection part may be connected to the housing through the reinforcing member.

In some embodiments, the reinforcing member may include a reinforcing ring, and the second connection part may be connected to an inner ring surface of the reinforcing ring and an end surface of the reinforcing ring.

In some embodiments, the reinforcing ring may be injection-molded on the second connection part.

In some embodiments, a ring width of the reinforcing ring may be greater than or equal to 0.4 mm.

In some embodiments, a hardness of the reinforcing ring may be greater than a hardness of the diaphragm.

In some embodiments, the magnetic circuit assembly may include a magnetic conduction cover and a magnet disposed inside the magnetic conduction cover, and the first connection part may be injection-molded on an outer peripheral surface of the magnetic conduction cover.

In some embodiments, the bone-conduction acoustic assembly may further include: a voice coil support connected to the housing, wherein the voice coil may be connected to the voice coil support, and the voice coil may extend into a magnetic gap between the magnet and the magnetic conduction cover; and an elastic member, wherein a central region of the elastic member may be connected to the magnet, and a peripheral region of the elastic member may be connected to the voice coil support such that the magnetic circuit assembly may be suspended in the housing.

In some embodiments, the voice coil support and the elastic member may be disposed in the first cavity.

In some embodiments, the voice coil support may include: a main body connected to the peripheral region of the elastic member; a first bracket, one end of the first bracket being connected to the main body, and the other end of the first bracket being connected to the voice coil; and a second bracket, one end of the second bracket being connected to the main body, and the other end of the second bracket pressing the reinforcing member on a platform of the housing.

In some embodiments, there may be a first distance from a connection point between the wrinkle part and the first connection part to a bottom surface of the bone-conduction acoustic assembly, there may be a second distance from the central region of the elastic member to the bottom surface of the bone-conduction acoustic assembly, and a ratio of the first distance to the second distance may be in a range of 0.3-0.8.

In some embodiments, there may be a third distance from a center of gravity of the magnet to the bottom surface of the bone-conduction acoustic assembly, and a ratio of the first distance to the third distance may be in a range of 0.7-2.

In some embodiments, the first distance may be greater than the third distance.

In some embodiments, at least a portion of the sound hole may be located between the connection point and the bottom surface of the bone-conduction acoustic assembly.

In some embodiments, a thickness of the diaphragm may be less than or equal to 0.2 mm.

Some of the additional characteristics of the present disclosure can be set forth in the description below. Additional characteristics, in part, will become apparent to those skilled in the art through a study of the following description and accompanying drawings, or through an understanding of the production or operation of the embodiments. The characteristics of the present disclosure can be implemented and obtained by practicing or using various aspects of the methods, means and combinations set forth in the following detailed embodiments.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
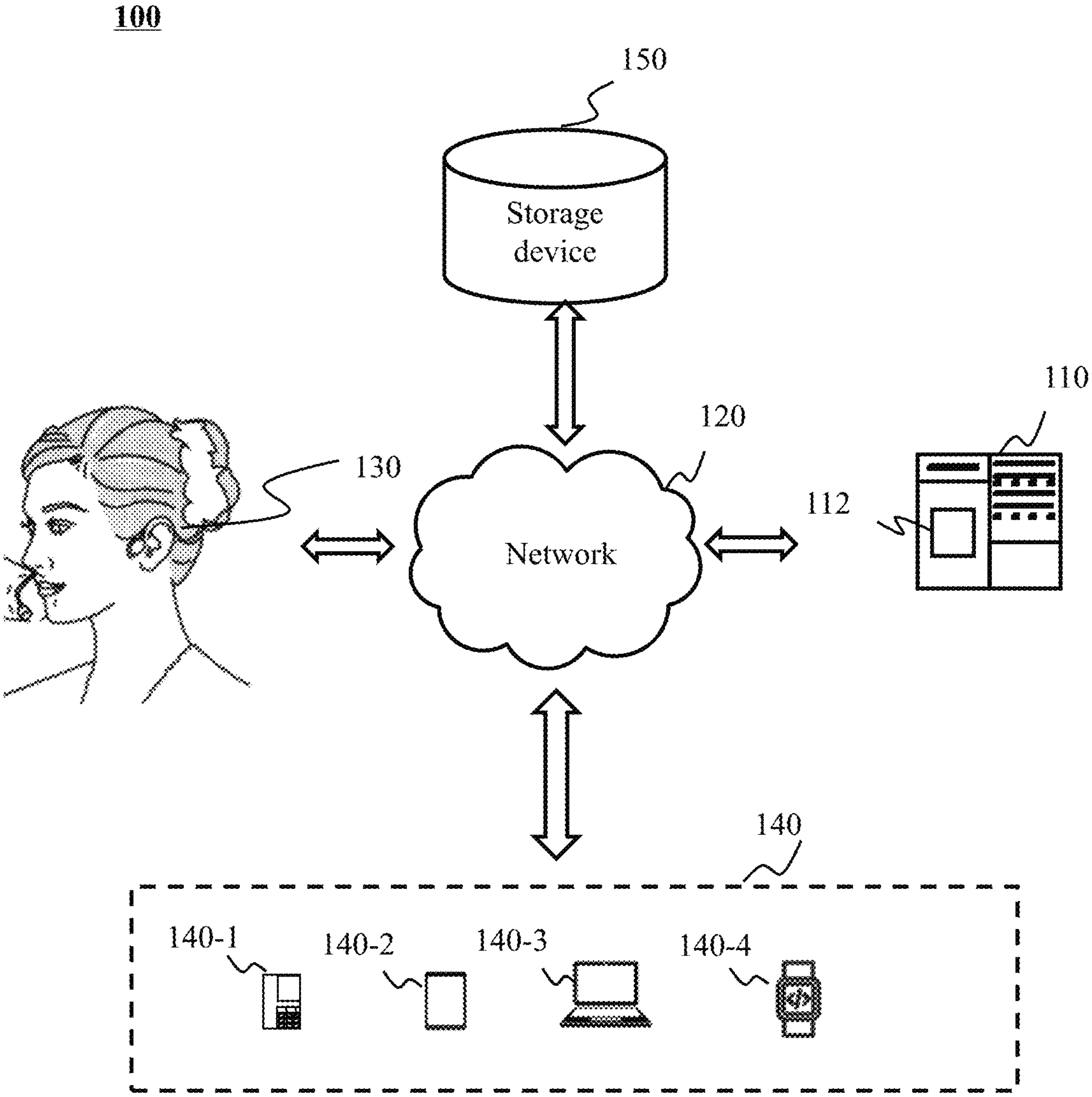
FIG. 1 is a schematic diagram illustrating an exemplary acoustic output system according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system," "device," "unit," and/or "module" as used herein is a method for distinguishing different components, elements, parts, portions or assemblies of different levels. However, the words may be replaced by other expressions if other words can achieve the same purpose.

As indicated in the disclosure and claims, the terms "a," "an," "and/or "the" are not specific to the singular form and may include the plural form unless the context clearly indicates an exception. Generally speaking, the terms "comprising," "comprise," "including," and "include" only suggest the inclusion of clearly identified steps and elements, and these steps and elements do not constitute an exclusive list, and the method or device may also contain other steps or elements.

The embodiments of the present disclosure provide an acoustic output apparatus. The acoustic output apparatus may include a bone-conduction acoustic assembly, an air-conduction acoustic assembly, and a housing. The bone-conduction acoustic assembly may be configured to generate bone-conduction acoustic waves, the air-conduction acoustic assembly may be configured to generate air-conduction acoustic waves, and the housing may include an accommodating chamber configured to accommodate the bone-conduction acoustic assembly and the air-conduction acoustic assembly. At least a portion of the housing may be in contact with a user's skin to transmit the bone-conduction sound waves under an action of the bone-conduction acoustic assembly. The air-conduction sound waves may be generated based on vibrations of at least one of the housing or the bone-conduction acoustic assembly when the bone-conduction sound waves are generated. In some embodiments, parameters such as a spatial position and/or a frequency response of the bone-conduction acoustic assembly and/or air-conduction acoustic assembly may be configured such that sound quality and low-frequency sound of the acoustic output apparatus may be improved, and sound leakage of the acoustic output apparatus may be reduced, thereby improving the audio experience of users.

FIG. 1 is a schematic diagram illustrating an exemplary acoustic output system according to some embodiments of the present disclosure. As shown in FIG. 1, the acoustic output system 100 may include a multimedia platform 110, a network 120, an acoustic output apparatus 130, a terminal device 140, and a storage device 150.

The multimedia platform 110 may communicate with one or more components of the acoustic output system 100 or an external data source (e.g., a cloud data center). In some embodiments, the multimedia platform 110 may provide data or signals (e.g., audio data of a piece of music) to the acoustic output apparatus 130 and/or the terminal device 140. In some embodiments, the multimedia platform 110 may facilitate data/signal processing for the acoustic output apparatus 130 and/or the end device 140. In some embodiments, multimedia platform 110 may be implemented on a single server or a server group. The server group may be a centralized server connected to the network 120 via an access point or a distributed server connected to the network 120 via one or more access points. In some embodiments, the multimedia platform 110 may be locally connected to the network 120 or remotely connected to the network 120. For example, the multimedia platform 110 may access information and/or data stored in the acoustic output apparatus 130, the terminal device 140 and/or the storage device 150 via the network 120. As another example, the storage device 150 may be used as a backend data storage of the multimedia platform 110. In some embodiments, the multimedia platform 110 may be implemented on a cloud platform. Merely by way of example, the cloud platform may include a private cloud, a public cloud, a hybrid cloud, a community cloud, a distributed cloud, an internal cloud, a multi-tier cloud, or the like, or any combination thereof.

In some embodiments, the multimedia platform 110 may include a processing device 112. The processing device 112 may perform main functions of the multimedia platform 110. For example, the processing device 112 may retrieve audio data from the storage device 150 and send the retrieved audio data to the acoustic output apparatus 130 and/or the terminal device 140 to generate sound. As another example, the processing device 112 may process a signal (e.g., generate a control signal) for the acoustic output apparatus 130.

In some embodiments, the processing device 112 may include one or more processing units (e.g., a single-core processing device or a multi-core processing device). Merely by way of example, the processing device 112 may include a central processing unit (CPU), an application-specific integrated circuit (ASIC), an application-specific instruction set processor (ASIP), a graphics processing unit (GPU), a physical processing unit (PPU), a digital signal processor (DSP), a field programmable gate array (FPGA), a programmable logic device (PLD), a controller, a micro-controller unit, a reduced instruction set computer (RISC), a microprocessor, or the like, or any combination thereof.

The network 120 may facilitate exchange of information and/or data. In some embodiments, one or more components (e.g., the multimedia platform 110, the acoustic output apparatus 130, the terminal device 140, and the storage device 150) of the acoustic output system 100 may send the information and/or data to other components of the acoustic output system 100 via the network 120. In some embodiments, the network 120 may be any type of wired or wireless network or a combination thereof. Merely by way of example, the network 120 may include a cable network, a wired network, a fiber optic network, a telecommunications network, an intranet, the Internet, a local area network (LAN), a wide area network (WAN), a wireless local area network (WLAN), a metropolitan area network (MAN), a public switched telephone network (PSTN), a Bluetooth network, a Zigbee network, a near field communication (NFC) network, a global system for mobile communications (GSM) network, a code division multiple access (CDMA) network, a time division multiple access (TDMA) network, a general packet radio service (GPRS) network, an enhanced data rate GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, an ultra wideband (UWB) network, infrared, or the like, or any combination thereof. In some embodiments, the network 120 may include one or more network access points. For example, the network 120 may include wired or wireless network access points, such as a base station and/or an Internet exchange point, through which one or more components of the acoustic output system 100 may be connect to the network 120 to exchange the data and/or information.

The acoustic output apparatus 130 may output sounds to a user and interact with the user. In some embodiments, the acoustic output apparatus 130 may at least provide the user with audio content, such as a song, a poem, a news broadcasting, a weather broadcasting, an audio lesson, etc. In some embodiments, the user may provide feedback to the acoustic output apparatus 130 via, e.g., a keystroke, a screen touch, a body motion, a voice, a gesture, thoughts (e.g., brain waves), etc. In some embodiments, the acoustic output apparatus 130 may include a wearable device. It should be noted that, unless otherwise specified, the wearable device as used herein may include a headphone and various other types of personal devices, such as a head-mounted device, a shoulder-mounted device, or a body-mounted device. The wearable device may present the audio content to the user. In some embodiments, the wearable device may include a smart headphone, smart glasses, a head-mounted display (HMD), a smart bracelet, a smart footwear, a smart helmet, a smart watch, smart clothing, a smart backpack, a smart accessory, a virtual reality (VR) helmet, VR glasses, VR goggles, an augmented reality (AR) helmet, AR glasses, AR goggles, or the like, or any combination thereof. Merely by way of example, the wearable device may be like Google-glass™, Oculus Rift™, Hololens™, Gear VR™, etc.

The acoustic output apparatus 130 may communicate with the terminal device 140 via the network 120. In some embodiments, communication data may include motion parameters (e.g., a geographic location, a moving direction, moving speed, acceleration, etc.), voice parameters (a voice volume, voice content, etc.), gestures (e.g., a handshake, shaking head, etc.), user's thoughts and other types of data and/or information, which may be received by the acoustic output apparatus 130. In some embodiments, the acoustic output apparatus 130 may further send the received data and/or information to the multimedia platform 110 or the terminal device 140.

In some embodiments, the terminal device 140 may be customized, e.g., via an application installed therein, to communicate with the acoustic output apparatus 130 and/or implement data/signal processing for the acoustic output apparatus 130. The terminal device 140 may include a mobile device 140-1, a tablet computer 140-2, a laptop computer 140-3, a vehicle built-in device 140-4, or the like, or any combination thereof. In some embodiments, the mobile device 140-1 may include a smart home device, a smart mobile device, or the like, or any combination thereof. In some embodiments, the smart home device may include a smart lighting device, a smart electrical device control device, a smart monitoring device, a smart TV, a smart camera, an interphone, or the like, or any combination thereof. In some embodiments, the smart mobile device may include a smartphone, a personal digital assistant (PDA), a gaming device, a navigation device, a point-of-sale (POS) device, or the like, or any combination thereof. In some embodiments, the vehicle built-in device 140-4 may include a built-in computer, a vehicle-mounted TV, a built-in tablet computer, or the like. In some embodiments, the terminal device 140 may include a signal transmitter and a signal receiver. The signal transmitter and signal receiver may be configured to communicate with a positioning device (not shown in the figure) to locate the user and/or the terminal device 140. In some embodiments, the multimedia platform 110 or the storage device 150 may be integrated into the terminal device 140. In such cases, the functions that can be implemented by the multimedia platform 110 may be similarly implemented by the terminal device 140.

The storage device 150 may store data and/or instructions. In some embodiments, the storage device 150 may store the data acquired from the multimedia platform 110, the acoustic output apparatus 130, and/or the terminal device 140. In some embodiments, the storage device 150 may store the data and/or instructions for implementing various functions for the multimedia platform 110, the acoustic output apparatus 130, and/or the terminal device 140. In some embodiments, the storage device 150 may include a mass memory, a removable memory, volatile read-write memory, a read-only memory (ROM), or the like, or any combination thereof. For example, the mass storage may include a magnetic disk, an optical disk, a solid-state drive, or the like. For example, the removable storage may include a flash drive, a floppy disk, an optical disk, a memory card, a compact disk, a magnetic tape, or the like. For example, the volatile read-write memory may include a random-access memory (RAM). For example, the RAM may include a dynamic RAM (DRAM), a double data rate synchronous dynamic RAM (DDR-SDRAM), a static RAM (SRAM), a thyristor RAM (T-RAM), a zero capacitor RAM (Z-RAM), or the like. For example, the ROM may include a mask ROM (MROM), a programmable ROM (PROM), an erasable programmable ROM (EPROM), an electrically erasable programmable ROM (EEPROM), a compact disc ROM (CD-ROM), a digital versatile disk ROM, or the like. In some embodiments, the storage device 150 may be implemented on a cloud platform. Merely by way of example, the cloud platform may include a private cloud, a public cloud, a hybrid cloud, a community cloud, a distributed cloud, an internal cloud, a multi-tier cloud, or the like, or any combination thereof. In some embodiments, one or more components of acoustic output system 100 may access the data or instructions stored in the storage device 150 via the network 120. In some embodiments, the storage device 150 may be directly connected to the multimedia platform 110 as a backend storage.

In some embodiments, the multimedia platform 110, the terminal device 140, and/or the storage device 150 may be integrated into the acoustic output apparatus 130. In some embodiments, as technology advances and the processing capability of the acoustic output apparatus 130 improves, all the processing may be performed by the acoustic output apparatus 130. For example, the acoustic output apparatus 130 may include a smart headphone, an MP3 player, a hearing aid, etc., with highly integrated electronic components, such as a central processing unit (CPU), a graphics processing unit (GPU), etc., thereby having a strong processing capability.

Figure 2:
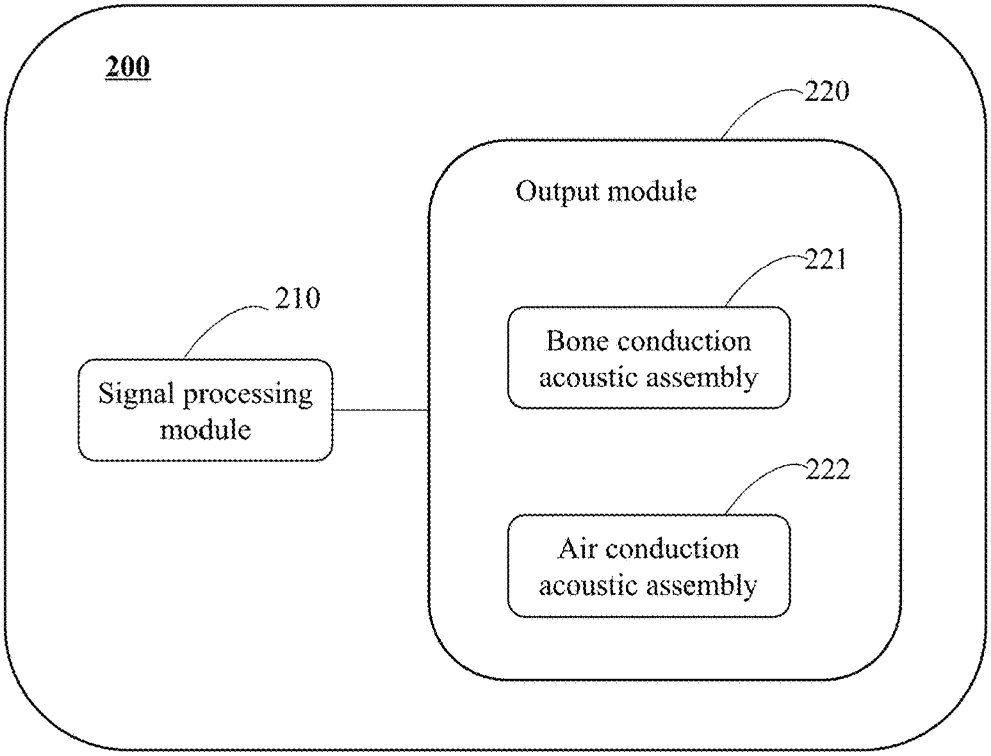
FIG. 2 is a block diagram illustrating an acoustic output apparatus according to some embodiments of the present disclosure.

FIG. 2 is a block diagram illustrating an acoustic output apparatus according to some embodiments of the present disclosure. As shown in FIG. 2, in some embodiments, the acoustic output apparatus 200 may include a signal processing module 210 and an output module 220. In some embodiments, the acoustic output apparatus 200 may be an embodiment of the acoustic output apparatus 130 of the acoustic output system 100. In some embodiments, the signal processing module 210 may receive an audio signal (e.g., an electrical signal) from a signal source and process the audio signal (e.g., the electrical signal). In some embodiments, the audio signal (e.g., the electrical signal) may represent audio content (e.g., music) to be output by the acoustic output apparatus. In some embodiments, the audio signal (e.g., the electrical signal) may be an analog signal or a digital signal. In some embodiments, the audio signal (e.g., the electrical signal) may be obtained from a local storage device, a cloud storage device, or other terminal devices or multimedia platforms.

The signal processing module 210 may process the audio signal (e.g., the electrical signal). For example, the signal processing module 210 may process the electrical signal by performing various signal processing operations (e.g., sampling, digitization, compression, frequency division, frequency modulation, encoding, etc.), or a combination thereof. In some embodiments, the signal processing module 210 may generate a control signal based on a processed audio signal (e.g., the electrical signal). In some embodiments, the control signal may be used to control the output module 220 to output corresponding sound waves (i.e., the audio content).

In some embodiments, an output module 220 may generate and output bone-conduction sound waves (also referred to as bone-conduction sound) and/or air-conduction sound waves (also referred to as air-conduction sound). The output module 220 may receive the control signal from the signal processing module 210 and generate the corresponding bone-conduction sound waves and/or air-conduction sound waves based on the control signal. It should be noted that, in the present disclosure, bone-conduction sound waves may refer to sound waves conducted through a solid medium (e.g., bone) in a form of mechanical vibration, and the air-conduction sound waves may refer to sound waves conducted through the air in the form of the mechanical vibration.

In some embodiments, the output module 220 may include a bone-conduction acoustic assembly 221 and an air-conduction acoustic assembly 222. In some embodiments, the bone-conduction acoustic assembly 221 and the air-conduction acoustic assembly 222 may be accommodated in a same housing. At least a portion of the housing may be used to contact a user's skin to transmit the bone-conduction sound waves generated by the bone-conduction acoustic assembly 221 to the user. In some embodiments, the bone-conduction acoustic assembly 221 and/or the air-conduction acoustic assembly 222 may be electrically coupled to the signal processing module 210. In some embodiments, the bone-conduction acoustic assembly 221 may generate the bone-conduction sound waves in a specific frequency range (e.g., low-frequency range, a medium frequency range, a high-frequency range, a mid-low frequency range, a mid-high frequency range, etc.) based on the control signal generated by the signal processing module 210. In some embodiments, the air-conduction acoustic assembly 222 may generate the air-conduction sound waves in the same or different frequency range as the bone-conduction acoustic assembly 221 based on vibrations of the bone-conduction acoustic assembly 221 and/or vibrations of the housing accommodating the bone-conduction acoustic assembly 221 and the air-conduction acoustic assembly 222.

In some embodiments, the bone-conduction acoustic assembly 221 and the air-conduction acoustic assembly 222 may be two independent functional devices or two independent components of a single device. As described herein, that a first device is independent of a second device represents that the operation of one of the first device and the second device is not caused by the operation of the other one of the first device and the second device, or in other words, the operation of one of the first device and the second device is not a result of the operation of the other one of the first device and the second device. Taking the bone-conduction acoustic assembly 221 and the air-conduction acoustic assembly 222 as an example, in some embodiments, the bone-conduction acoustic assembly 221 and the air-conduction acoustic assembly 222 may respectively obtain control signals from the signal processing module 210, and generate corresponding sound waves based on their corresponding control signal.

In some embodiments, the bone-conduction acoustic assembly 221 and the air-conduction acoustic assembly 222 may be two functional devices or components that are independent in function but interdependent in operation. For example, the air-conduction acoustic assembly may rely on the bone-conduction acoustic assembly, and when the bone-conduction acoustic assembly generates bone-conduction sound waves, vibrations of the bone-conduction acoustic assembly may drive the air-conduction acoustic assembly to vibrate to generate air-conduction sound waves. As another example, when the bone-conduction acoustic assembly 221 receives the control signal from the signal processing module 210, the bone-conduction acoustic assembly 221 may vibrate to generate the bone-conduction sound waves. The vibrations of the bone-conduction acoustic assembly 221 may drive the housing to vibrate, and the vibration of the housing and/or the vibration of the bone-conduction acoustic assembly 221 may drive the air-conduction acoustic assembly 222 to vibrate to generate the air-conduction sound waves.

In some embodiments, different frequency ranges may be determined according to actual needs. For example, the low-frequency range (also referred to as low frequencies) may refer to a frequency range from 20 Hz to 150 Hz, the medium frequency range (also referred to as medium frequencies) may refer to a frequency range from 150 Hz to 5 kHz, the high-frequency range (also referred to as high frequencies) may refer to a frequency range from 5 kHz to 20 kHz, the mid-low frequency range (also referred to as mid-low frequencies) may refer to a frequency range from 150 Hz to 500 Hz, and the mid-high frequency range (also referred to as mid-high frequencies) may refer to a frequency range from 500 Hz to 5 kHz. As another example, the low-frequency range may refer to a frequency range from 20 Hz to 300 Hz, the medium frequency range may refer to a frequency range from 300 Hz to 3 kHz, the high-frequency range may refer to a frequency range from 3 kHz to 20 kHz, the mid-low frequency range may refer to a frequency range from 100 Hz to 1000 Hz, and the mid-high frequency range may refer to a frequency range from 1000 Hz to 10 kHz. It should be noted that the above frequency ranges are for illustrative purposes only and are not intended to be limiting. The definition of the frequency range may vary according to different application scenarios and different classification standards. For example, in some other application scenarios, the low-frequency range may refer to a frequency range from 20 Hz to 80 Hz, the medium frequency range may refer to a frequency range from 160 Hz to 1280 Hz, the high-frequency range may refer to a frequency range from 2560 Hz to 20 kHz, the mid-low frequency range may refer to a frequency range from 80 Hz-160 Hz, and the mid-high frequency range may refer to a frequency range from 1280 Hz to 2560 Hz. In some embodiments, different frequency ranges may have or not have overlapping frequencies.

Merely by way of example, the air-conduction acoustic assembly 222 may generate and output air-conduction sound waves having the same or different frequency range as the bone-conduction sound waves generated by the bone-conduction acoustic assembly 221. For example, in some embodiments, the bone-conduction sound waves may include bone-conduction sound waves in mid-high frequencies, and the air-conduction sound waves may include air-conduction sound waves in mid-low frequencies. The air-conduction sound waves in the mid-low frequencies may be used as a supplement to the bone-conduction sound waves in the mid-high frequencies such that a total output of the acoustic output apparatus may cover the mid-low frequencies and the mid-high frequencies. In such cases, the acoustic output apparatus may provide better sound quality (especially at low frequencies), and intense vibrations of the bone-conduction speaker at low frequencies may be avoided.

As another example, the bone-conduction sound waves may include bone-conduction sound waves in mid-low frequencies, and the air-conduction sound waves may include air-conduction sound waves in mid-high frequencies. In such cases, since the user is sensitive to bone-conduction sound waves in the mid-low frequencies and/or the air-conduction sound waves in the mid-high frequencies, the acoustic output apparatus may provide prompts or warnings to the user via the bone-conduction acoustic assembly and/or the air-conduction acoustic assembly.

As another example, the air-conduction sound waves may include the air-conduction sound waves in mid-low frequencies, and the bone-conduction sound waves may include frequencies in a wider frequency range than the air-conduction sound waves, thereby enhancing the output effect in the mid-low frequencies and improving the sound quality.

It should be noted that the acoustic output apparatus provided in the embodiments of the present disclosure may include, but is not limited to, a headphone, a loudspeaker, or other electronic devices. In some embodiments, the acoustic output apparatus may also be a portion of the headphone, the loudspeaker, or other electronic devices.

The acoustic output apparatus provided by the embodiments of the present disclosure will be described in detail below by taking the headphone as an example in combination with the accompanying drawings.

Figure 3:
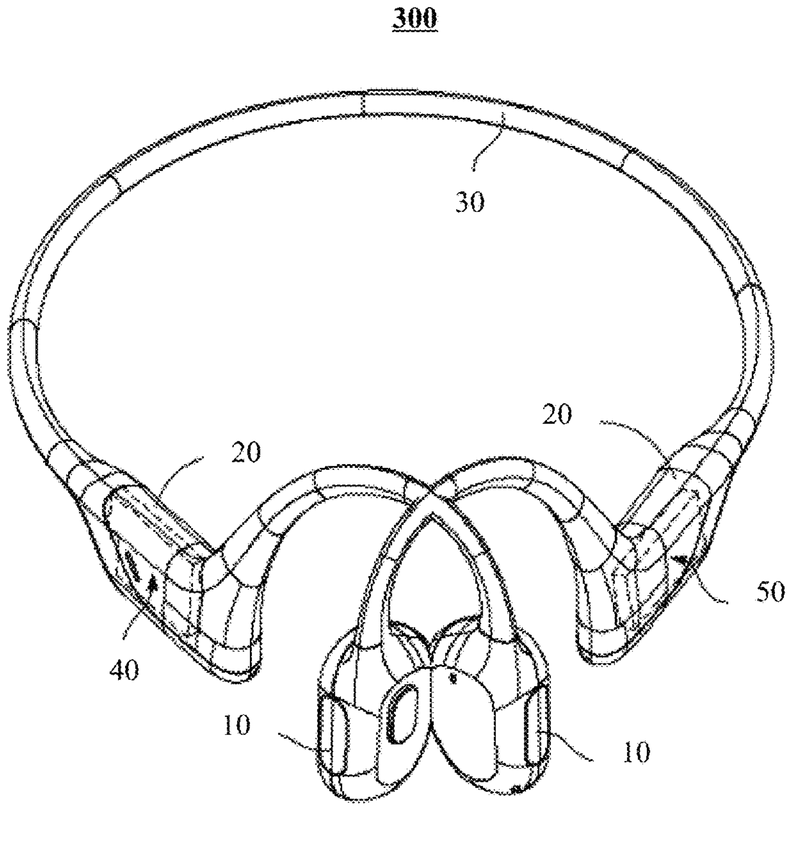
FIG. 3 is a schematic structural diagram illustrating a headphone according to some embodiments of the present disclosure.

FIG. 3 is a schematic structural diagram illustrating a headphone according to some embodiments of the present disclosure. As shown in FIG. 3, the headphone 300 may include two core modules 10, two ear-hook components 20, and a rear-hook component 30. Two ends of the rear-hook component 30 may be connected to one end of a corresponding ear-hook component 20, respectively. The other end of each ear-hook component 20 away from the rear-hook component 30 may be connected to a corresponding core module 10. In some embodiments, the rear-hook component 30 may have a curved shape for wrapping around a rear side of the user's head, and the ear-hook component(s) 20 may also have a curved shape to be hung between the user's ears and the user's head (e.g., a position above the ear), so as to facilitate the wearing of the headphone 300. In some embodiments, the core module(s) 10 may include a bone-conduction acoustic assembly 221 and an air-conduction acoustic assembly 222 for converting an electrical signal into mechanical vibrations such that the user may hear the sound through the headphone 300. When the headphone 300 is worn, the two core modules 10 may be positioned on a left side and a right side of the user's head, respectively, and the two core modules 10 may press the user's head under coordination of the two ear-hook components 20 and the rear-hook component 30 such that the user may hear the sound output by the headphone 300 through bone conduction and/or air conduction.

In some embodiments, the headphone 300 may also be worn in other manners. For example, the ear-hook components 20 may cover or enclose the user's ears. As another example, the rear-hook component 30 may straddle the top of the user's head, which is not listed herein.

Referring to FIG. 3, the headphone 300 may further include a main control circuit board 40 and a battery 50. The main control circuit board 40 and the battery 50 may be disposed in an accommodating chamber of a same ear-hook component 20, or may be arranged in the accommodating chambers of the two ear-hook components 20, respectively. In some embodiments, the main control circuit board 40 and the battery 50 may be electrically connected to the two core modules 10 through corresponding leads. In some embodiments, the main control circuit board 40 may be configured to control the core modules 10 to convert the electrical signal into the mechanical vibrations, and the battery 50 may be configured to provide electrical energy to the headphone 300. It should be noted that the headphone 300 described in the embodiments of the present disclosure may also include microphone devices such as a microphone, a sound pickup, and communication components such as a Bluetooth, an NFC, which may also be connected to the main control circuit board 40 and the battery 50 through corresponding leads to achieve corresponding functions. In some embodiments, there may be two core modules 10 that may convert the electrical signal into the mechanical vibrations such that the headphone 300 can achieve stereo sound effects, which may improve the user experience. In some other application scenarios that do not require particularly high stereo sound, for example, hearing aids for hearing impaired patients, teleprompters in live broadcasts by hosts, etc., the headphone 300 may include only one core module 10.

According to the descriptions above, the core modules 10 may be configured to convert the electrical signal into the mechanical vibrations in a power-on state such that the user may hear the sound through the headphone 300. In some embodiments, the mechanical vibrations may directly act on the user's auditory nerve mainly with the user's bones and tissues as the media based on a principle of bone-conduction, or the mechanical vibrations may act on the user's auditory nerve mainly with the air as the medium based on a principle of air-conduction. For the sound heard by the user, the mechanical vibrations acting on the user's auditory nerve mainly through the user's bones may be referred to as "bone-conduction sound," and the mechanical vibrations acting on the user's auditory nerve mainly through the air may be referred to as "air-conduction sound." Accordingly, the core modules 10 may generate both the bone-conduction sound and the air-conduction sound, and may also generate the bone-conduction sound and the air-conduction sound simultaneously.

It should be noted that the description of the headphone 300 is provided for illustrative purposes only, and is not intended to limit the scope of the present disclosure. Those skilled in the art may make various alterations and modifications based on the description of the present disclosure. However, these variations and modifications do not depart from the scope of the present disclosure. In some embodiments, the headphone 300 may further include one or more other components. In some embodiments, one or more components of headphone 300 may be deleted. For example, the headphone 300 may include one core module 10 and/or one ear-hook component 20. As another example, the headphone 300 may not include the rear-hook component 30.

Figure 4:
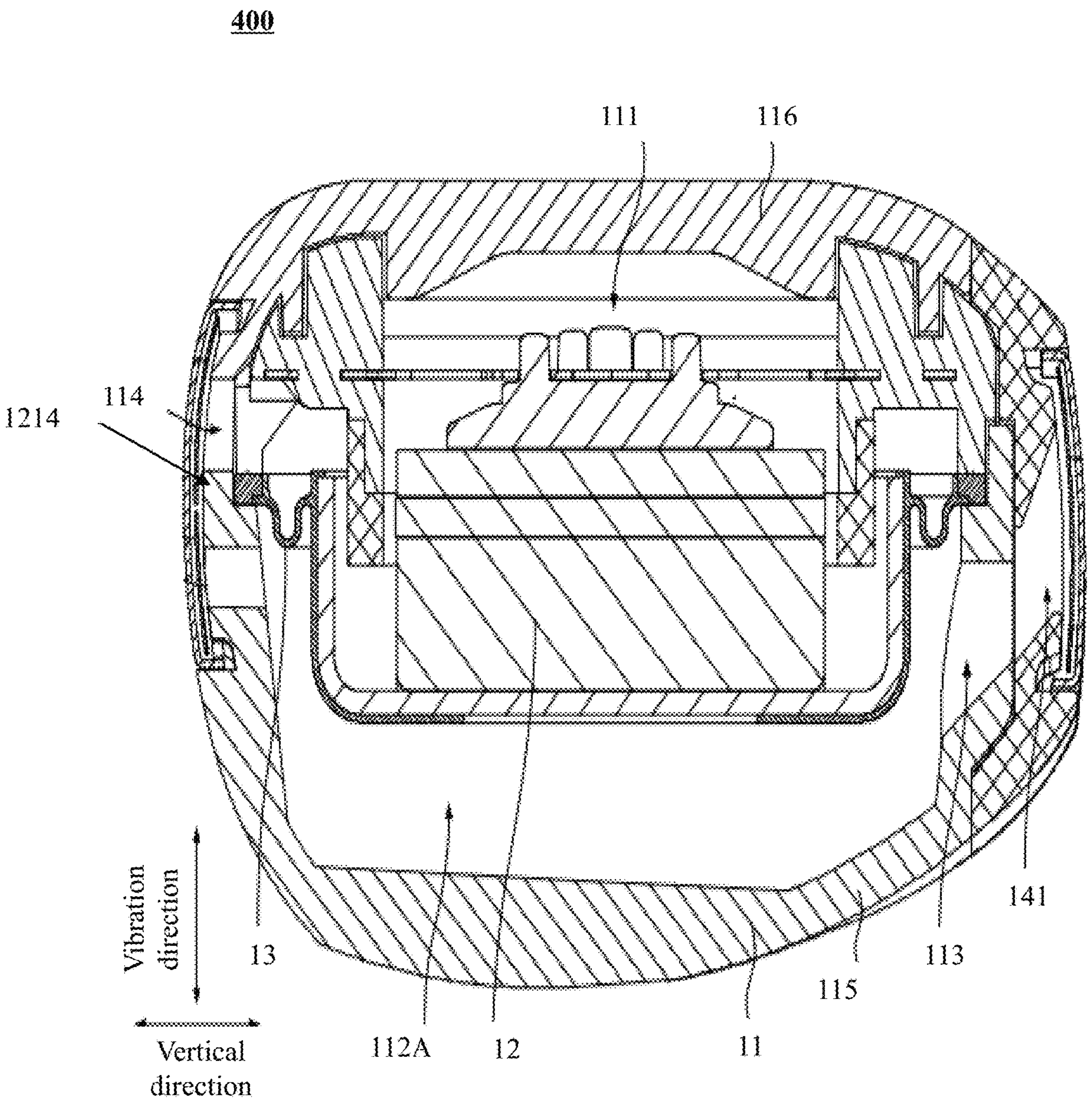
FIG. 4 is a schematic diagram illustrating a cross-section of a core module according to some embodiments of the present disclosure.

FIG. 4 is a schematic diagram illustrating a cross-section of a core module according to some embodiments of the present disclosure. In some embodiments, a core module 10 of the acoustic output apparatus 300 in FIG. 3 may have a same or similar structure as core module 400 in FIG. 4. In some embodiments, the core module 400 may also be referred to as an output module. In some embodiments, the core module 400 may include a bone-conduction acoustic assembly and/or an air-conduction acoustic assembly.

As shown in FIG. 4, the core module 400 may include a housing 11 and a transducer 12. In some embodiments, the transducer 12 may be used as a bone-conduction acoustic assembly (e.g., the bone-conduction acoustic assembly 221 in FIG. 2) or as a portion of the bone-conduction acoustic assembly. In some embodiments, the housing 11 may be connected to one end of an ear-hook component, and configured to contact a user's skin to transmit mechanical vibrations to the user. In some embodiments, the housing 11 may include an accommodating chamber (not shown in the figure). The transducer 12 may be disposed in the accommodating chamber and connected to the housing 11. In some embodiments, the transducer 12 may be configured to convert an electrical signal into mechanical vibrations in a power-on state such that a skin contact region of the housing 11 (e.g., a front bottom plate 1161 in FIG. 6) may generate bone-conduction sound under an action of the transducer 12. In such cases, when the user wears the headphone 300, the electrical signal may be converted into the mechanical vibration through the transducer 12 to drive the skin contact region to generate mechanical vibrations, and the mechanical vibrations may further act on the user's auditory nerve through the user's bones and tissues such that the user may hear the bone-conduction sound through the core modules 400. For example, exemplary signal conversion manners may include, but not limited to, an electromagnetic type (e.g., a moving voice coil type, a moving iron type, and a magneto strictive type), a piezoelectric type, an electrostatic type, or the like.

In some embodiments, the core module 400 may include a diaphragm 13 connected between the transducer 12 and the housing 11. The diaphragm 13 may be an air-conduction acoustic assembly (e.g., the air-conduction acoustic assembly 222 in FIG. 2) or a portion of the air-conduction acoustic assembly. In some embodiments, the diaphragm 13 may be physically connected to at least one of the bone-conduction acoustic assembly 221 or the housing 11. The vibrations of the at least one of the bone-conduction acoustic assembly 221 or the housing 11 may drive the diaphragm 13 to generate air-conduction sound waves. For example, the diaphragm 13 may have an annular structure (e.g., an annular structure in FIG. 15), an inner side of the diaphragm 13 may surround the transducer 12, and an outer side of the diaphragm 13 may be connected to the housing 11.

In some embodiments, the diaphragm 13 may separate an inner space (i.e., the accommodating chamber) of the housing 11 into a first cavity 111 (also referred to as a front chamber) close to the skin contact region and a second cavity 112A (also referred to as a rear chamber) away from the skin contact region. A first portion of the housing 11 may form the first cavity 111 and be connected to the transducer 12 to transmit the bone-conduction sound waves. A second portion of the housing 11 may form the second cavity 112A. In other words, when the user wears the headphone 300, the first cavity 111 may be closer to the user than the second cavity 112A. In some embodiments, the housing 11 may include a sound hole 113 in communication with the second cavity 112A. The diaphragm 13 may generate air-conduction sound during a relative movement between the transducer 12 and the housing 11, and transmit the air-conduction sound to the human ears through the sound hole 113. In other words, the diaphragm 13 may be connected to the housing 11 and/or the transducer 12. When the transducer 12 moves relative to the housing 11, the housing 11 and/or the transducer 12 may drive the diaphragm 13 to vibrate together to generate the air-conduction sound. The air-conduction sound may be output through the sound hole 113. In such cases, the sound generated in the second cavity 112A may be transmitted through the sound hole 113, and then act on the user's eardrums through the air such that the user may also hear the air-conduction sound through the core modules 400.

In some embodiments, the core module 400 may include one or more (e.g., two or more) diaphragms 13. Merely by way of example, in some embodiments, the core module 400 may include a first diaphragm and a second diaphragm. In some embodiments, the first diaphragm and the second diaphragm may be disposed substantially parallel or obliquely with respect to each other. In some embodiments, the first diaphragm and the second diaphragm may be located between a bottom surface (e.g., a surface of the bone-conduction acoustic assembly 221 away from the skin contact region) of the bone-conduction acoustic assembly (e.g., the bone-conduction acoustic assembly 221 in FIG. 2) and a bottom surface (e.g., a bottom plate 1151 in FIG. 6) of the housing 11. The first diaphragm may be connected to the bone-conduction acoustic assembly 221, and the second diaphragm may be connected to the housing 11 such that the first diaphragm may receive vibrations from the bone-conduction acoustic assembly 221 and the second diaphragm may receive vibrations from the housing 11. More descriptions regarding the diaphragm may be found elsewhere in the present disclosure (e.g., detailed descriptions in FIGS. 14-20).

In some embodiments, the air-conduction acoustic assembly (e.g., the air-conduction acoustic assembly 222 in FIG. 2) may include an independent drive source. The diaphragm 13 may be a portion of the air-conduction acoustic assembly, and may be connected to the drive source of the air-conduction acoustic assembly such that the diaphragm 13 may vibrate under the drive of the drive source and generate the air-conduction sound. For example, the air-conduction acoustic assembly may not rely on the bone-conduction acoustic assembly, and may include an independent drive source. The diaphragm 13 may be connected to the drive source and vibrate under the drive of the drive source to generate the air-conduction sound. Merely by way of example, the drive source may include a transducer. The transducer may be similar to the transducer 12. It should be noted that, to ensure synchronization of the air-conduction sound and the bone-conduction sound generated by the core module 400, the vibrations generated by the transducer 12 and the vibrations generated by the drive source in the air-conduction acoustic assembly may have a same phase or similar phases. For example, a phase difference between the vibrations generated by the transducer 12 and the vibrations generated by the drive source in the air-conduction acoustic assembly may be less than a threshold, such as $\pi$, $2\pi/3$, $\pi/2$, etc.

In some embodiments, referring to FIG. 4, that the transducer 12 causes the skin contact region to move toward the user's face may be simply regarded as an enhancement of the bone-conduction sound. Meanwhile, a portion of the housing 11 opposite to the skin contact region may move towards the user's face, and the transducer 12 and the diaphragm 13 connected thereto may move away from the user's face due to a relationship between an action force and a reaction force. In such cases, the air in the second cavity 112A may be squeezed, which causes an increase in the air pressure and enhances the sound transmitted through the sound hole 113, which may be simply regarded as an enhancement of the air-conduction sound. Correspondingly, when the bone-conduction sound is weakened, the air-conduction sound may also be weakened. In such cases, the bone-conduction sound and the air-conduction sound generated by the core module 400 of the present disclosure may have same or similar phase characteristics.

In some embodiments, since the first cavity 111 and the second cavity 112A are substantially separated by structures such as the diaphragm 13 and the transducer 12, a change rule of the air pressure in the first cavity 111 may be exactly opposite to a change rule of the air pressure in the second cavity 112A. Accordingly, the housing 11 may also include a relief hole 114 in communication with the first cavity 111. The relief hole 114 may enable the first cavity 111 to communicate with an external environment, i.e., the air may freely enter and exit the first cavity 111. In such cases, a change of the air pressure in the second cavity 112A may not be blocked by the first cavity 111 as much as possible, which may effectively improve acoustic performance of the air-conduction sound generated by the core modules 400. In some embodiments, the relief hole 114 may not be adjacent to the sound hole 113 such that sound attenuation due to opposite phases of sounds transmitted from the relief hole 114 and the sound hole 113 may be reduced as much as possible. For example, the relief hole 114 may be as far away from the sound hole 113 as possible. Merely by way of example, an actual area of an outlet end of the sound hole 113 may be greater than or equal to 8 $mm^2$ such that the user may hear more air-conduction sound. An actual area of an inlet end of the sound hole 113 may be greater than or equal to the actual area of the outlet end of the sound hole 113.

In some embodiments, as structures such as the housing 11 have a certain thickness, a through hole such as the sound hole 113 and the relief hole 114 in the housing 11 may have a certain depth. Thus for the accommodating cavity, the through hole such as the sound hole 113 and the relief hole 114 may have the inlet end close to the accommodating chamber and the outlet end away from the accommodating chamber. Further, the actual area of the outlet end described in the present disclosure may be defined as an area of an end surface where the outlet end is located.

According to the method above, since the air-conduction sound and the bone-conduction sound generated by the core modules 400 originate from a same vibration source (i.e., the transducer 12), phases of the air-conduction sound and the bone-conduction sound are also the same or similar such that the user may hear an enhanced sound through the acoustic output apparatus (e.g., a headphone including the core module 400), and the acoustic output apparatus (e.g., the headphone including the core module 400) may be more energy-efficient, thereby extending endurance of the acoustic output apparatus (e.g., the headphone including the core module 400). In addition, the air-conduction sound and the bone-conduction sound may also cooperate with each other in a frequency band of a frequency response curve by reasonable structural design of the core modules 400 such that the headphone 300 may have excellent acoustic performance in a specific frequency band. For example, the headphone 300 may have better acoustic performance in a low frequency by compensating the low-frequency band of the bone-conduction sound using the air-conduction sound. As another example, the sound quality of the headphone 300 may be enhanced by enhancing the mid-frequency band and the mid-high frequency band of the bone-conduction sound using the air-conduction sound.

In some embodiments, a frequency response curve of the bone-conduction sound may include at least one resonance peak. When the diaphragm 13 is connected to the transducer 12 and the housing 11, the at least one resonance peak may have a first resonance frequency f1, and when the diaphragm 13 is disconnected from the at least one or the transducer 12 or the housing 11, the at least one resonance peak may have a second resonance frequency f2. A ratio of an absolute value of a difference between the first resonance frequency f1 and the second resonance frequency f2 to the first resonance frequency f1 may be less than a threshold. For example, the ratio may be less than or equal to 50% (i.e., $|f1-f2|/f1 \leq 50\%$). As another example, the ratio may be less than or equal to 40%. As another example, the ratio may be less than or equal to 30%. As another example, the ratio may be less than or equal to 20%. In some embodiments, a difference between a resonance peak intensity corresponding to f1 and a resonance peak intensity corresponding to f2 may be less than or equal to 5 dB. In some embodiments, the difference between the resonance peak intensity corresponding to f1 and the resonance peak intensity corresponding to f2 may be less than or equal to 3 dB. In some embodiments, the difference between the resonance peak intensity corresponding to f1 and the resonance peak intensity corresponding to f2 may be less than or equal to 1 dB. In some embodiments, $|f1-f2|/f1$ may indicate an influence of the diaphragm 13 on an effect of the transducer 12 driving the skin contact region, the smaller the ratio, the smaller the effect. In such cases, the core module 400 may synchronously output the bone-conduction sound and the air-conduction sound with the same or similar phases by introducing the diaphragm 13 without affecting an original resonant system of the core module 400 as much as possible, thereby improving the acoustic performance of the core module 400. In the acoustic output apparatus provided in this embodiment, the transducer 12 may drive the diaphragm 13 to vibrate to generate the air-conduction sound, without driving the diaphragm 13 separately. Compared with the traditional acoustic output apparatus that drives the diaphragm to generate the air-conduction sound separately, the acoustic output apparatus may be more energy-efficient.

For example, an offset of a resonance peak in the low-frequency band or a mid-low frequency band (e.g., $f1 \leq 500$ Hz) may satisfy certain conditions such that the low frequency and/or the mid-low frequency of the bone-conduction sound may not be affected by the diaphragm 13 as much as possible. The offset of the resonance peak may refer to the absolute value of the difference between the first resonance frequency f1 and the second resonance frequency f2 (i.e., $|f1-f2|$) of the at least one resonance peak. In some embodiments, the offset of the resonance peak of the low-frequency band or the mid-low frequency band (i.e., $f1 \leq 500$ Hz) may be less than or equal to 50 Hz (i.e., $|f1-f2| \leq 50$ Hz). In some embodiments, the offset of the resonance peak in the low-frequency band or the mid-low frequency band (i.e., $f1 \leq 500$ Hz) may be less than or equal to 30 Hz (i.e., $|f1-f2| \leq 30$ Hz). In some embodiments, the offset of the resonance peak in the low-frequency band or the mid-low frequency band (i.e., $f1 \leq 500$ Hz) may be less than or equal to 100 Hz (i.e., $|f1-f2| \leq 100$ Hz) such that the diaphragm 13 may not affect the effect of the transducer 12 driving the skin contact region as much as possible, i.e., the bone-conduction sound may not be affected as much as possible. In some embodiments, in order to make the diaphragm 13 have a certain structural strength and elasticity, reduce fatigue deformation of the diaphragm 13 in use, and extend service life of the diaphragm 13, the offset may be greater than or equal to 5 Hz (i.e., $|f1-f2| \geq 5$ Hz). In some embodiments, the offset may be greater than or equal to 5 Hz and less than or equal to 50 Hz to make the diaphragm 13 have a certain structural strength and elasticity while not affecting the effect of the transducer 12 driving the skin contact region to vibrate.

Figure 5:
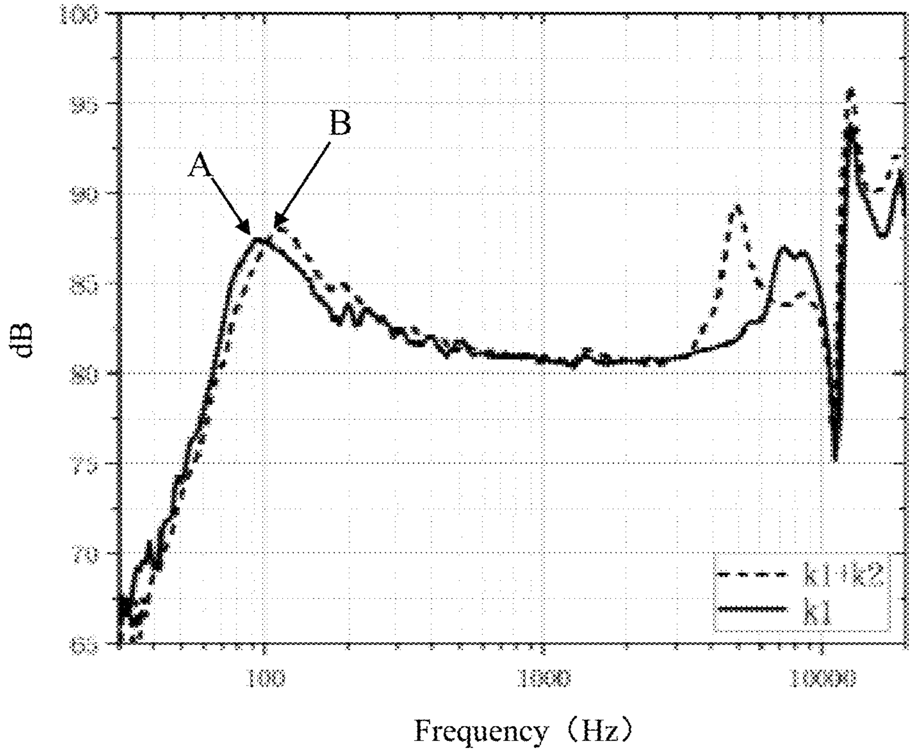
FIG. 5 is a schematic diagram illustrating frequency response curves of a core module 400 in FIG. 4 according to some embodiments of the present disclosure.

FIG. 5 is a schematic diagram illustrating frequency response curves of the core module 400 in FIG. 4 according to some embodiments of the present disclosure. As shown in FIG. 5, the skin contact region may generate the bone-conduction sound under an action of the transducer 12, and the bone-conduction sound may have a corresponding frequency response curve. The frequency response curve may have at least one resonance peak. As shown in FIG. 5, the skin contact region may have a first frequency response curve (e.g., k1+k2 indicated by a dotted line in FIG. 5) when the diaphragm 13 is connected to the transducer 12 and the housing 11, and the skin contact region may have a second frequency response curve (e.g., k1 indicated by a solid line in FIG. 5) when the vibrating diagram 13 is disconnected from any one of the transducer 12 and the housing 11. It should be noted that, for the frequency response curves in FIG. 5 of the present disclosure, a horizontal axis may represent a frequency in Hz; and a vertical axis may represent an intensity in dB. A resonance frequency (i.e., the second resonance frequency) corresponding to a resonance peak A of the second frequency response curve k1 may be 95 Hz. A resonance frequency (i.e., the first resonance frequency) corresponding to a resonance peak B of the first frequency response curve k1+k2 may be 112 Hz. An offset of the resonance peak frequency (i.e., $|f1-f2|$) may be approximately 17 Hz. In some embodiments, to ensure that the diaphragm 13 has a certain structural strength and elasticity, a resonance peak frequency may have a preset offset. Merely by way of example, the offset may be in a range of 10 Hz-50 Hz.

Figure 6:
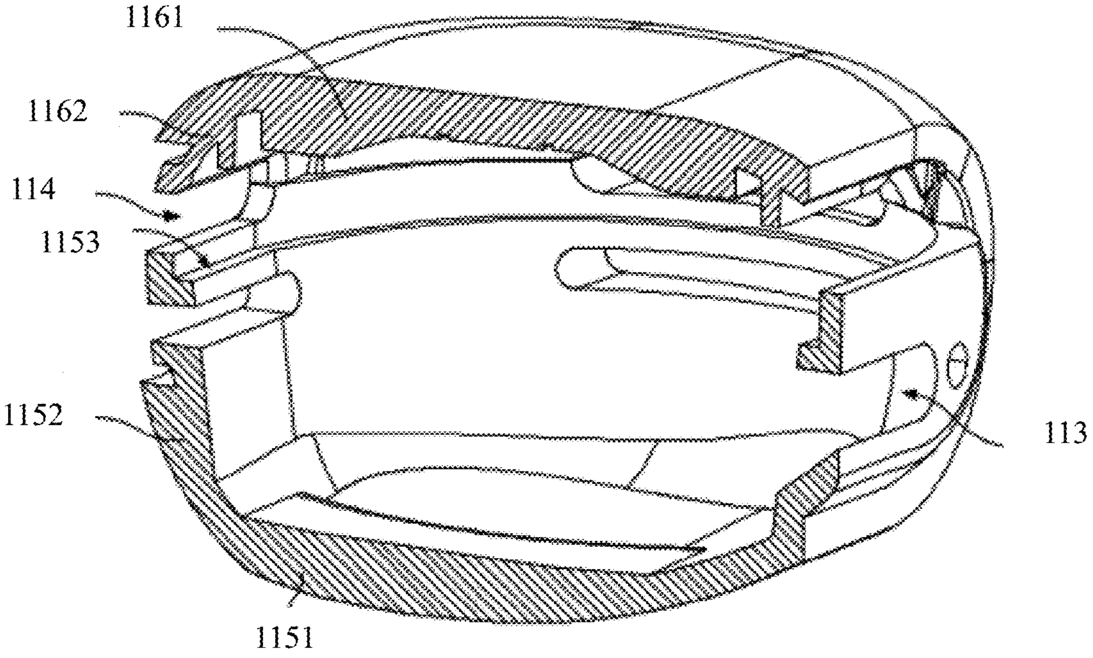
FIG. 6 is a schematic diagram illustrating a cross-section of an exemplary structure of a core housing 11 in FIG. 4 according to some embodiments of the present disclosure.

FIG. 6 is a schematic diagram illustrating a cross-section of an exemplary structure of a core housing 11 in FIG. 4 according to some embodiments of the present disclosure. Referring to FIG. 4, in some embodiments, the housing 11 may include a rear housing 115 (i.e., the second portion of the housing 11 in FIG. 4) and a front housing 116 (i.e., the first portion of the housing 11 in FIG. 4) connected to the rear housing 115. In some embodiments, the rear housing 115 and the front housing 116 may be spliced and enclosed together to form an accommodating chamber configured to accommodate components such as the transducer 12 and the diaphragm 13. In some embodiments, at least a portion of the front housing 116 may be in contact with the user's skin to form a skin contact region of the housing 11, i.e., when the housing 11 is in contact with the user's skin, the front housing 116 may be closer to the user than the rear housing 115. In such cases, the transducer 12 may be connected to the front housing 116 such that the transducer 12 may drive the skin contact region of the housing 11 to generate mechanical vibrations. In some embodiments, the housing 11 may include a sound hole 113 and a relief hole 114. The sound hole 113 may be disposed on the rear housing 115, and the relief hole 114 may be disposed on the front housing 116. In some embodiments, the diaphragm 13 may be connected to the rear housing 115, or may be connected to the front housing 116, or may be connected at a joint between the rear housing 115 and the front housing 116.

In some embodiments, the rear housing 115 may include a bottom plate 1151 and a side plate 1152. An end of the side plate 1152 away from the bottom plate 1151 may be connected to the front housing 116. The sound hole 113 may be disposed on the side plate 1152. In some embodiments, the bottom plate 1151 and the side plate 1152 may be integrally formed. In some embodiments, the bottom plate 1151 may be physically connected to the side plate 1152 through, for example, welding, riveting, bonding, or the like.

In some embodiments, an inner surface of the housing 11 may include a platform 1153. For example, the platform 1153 may be disposed at an end of the side plate 1152 away from the bottom plate 1151. Referring to FIG. 6, taking the bottom plate 1151 as a reference, the platform 1153 may be slightly lower than an end surface of the side plate 1152 away from the bottom plate 1151. Referring to FIG. 4, in a vibration direction of the transducer 12, the sound hole 113 may be disposed between the platform 1153 and the bottom plate 1151. In such cases, a cross-section area of the sound hole 113 may gradually decrease in a direction (i.e., a direction in which the sound hole 113 faces a sound guide channel 141 mentioned hereinafter) from an inlet end of the sound hole 113 to an outlet end of the sound hole such that the platform 1153 may have a sufficient thickness in the vibration direction of the transducer 12, thereby increasing structural strength of the platform 1153. The outlet end of the sound hole 113 may be an inlet end of the sound guide channel 141 connected to the sound hole 113. In such cases, when the rear housing 115 is fastened with the front housing 116, the front housing 116 may press and fix a voice coil support 121 mentioned hereinafter on the platform 1153. In some embodiments, the diaphragm 13 may be fixed on the platform 1153, or pressed on the platform 1153 by the voice coil support 121, and then connected to the housing 11.

In some embodiments, the front housing 116 may include a bottom plate 1161 and a side plate 1162, and an end of the side plate 1162 away from the bottom plate 1161 may be connected to the rear housing 115. A region where the bottom plate 1161 is located may be simply regarded as the skin contact region described in the present disclosure. Correspondingly, the relief hole 114 may be disposed on the side plate 1162. In some embodiments, the bottom plate 1161 and the side plate 1162 may be integrally formed. In some embodiments, the bottom plate 1161 may be physically connected to the side plate 1162 through, for example, welding, riveting, bonding, or the like.

Figure 7:
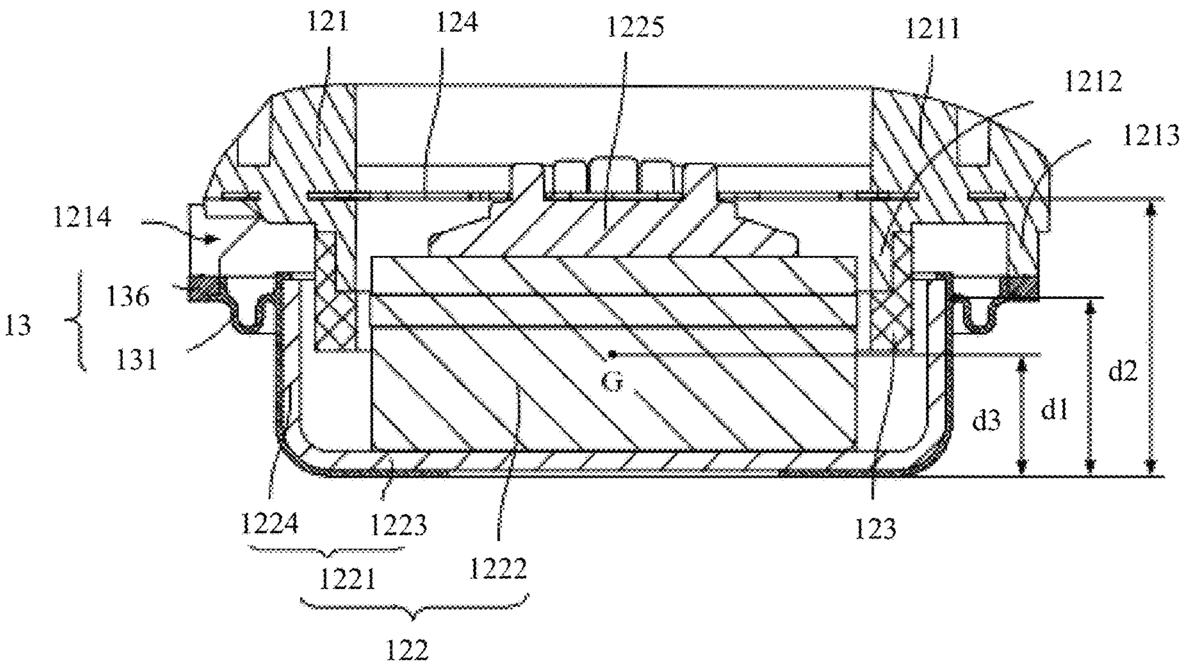
FIG. 7 is a schematic diagram illustrating a cross-section of an exemplary structure of a transducer 12 in FIG. 4 according to some embodiments of the present disclosure.

FIG. 7 is a schematic diagram illustrating a cross-section of an exemplary structure of the transducer 12 in FIG. 4 according to some embodiments of the present disclosure. As shown in FIG. 7, in some embodiments, the transducer 12 may include a voice coil support 121, a magnetic circuit assembly 122, a voice coil 123, and an elastic member 124. In some embodiments, the elastic member 124 may include a spring sheet, an elastic structure (e.g., a sheet structure), or the like. In some embodiments, the voice coil support 121 and the elastic member 124 may be disposed in the first cavity 111. A central region of the elastic member 124 may be physically connected to the magnetic circuit assembly 122, and a peripheral region of the elastic member 124 may be connected to the housing 11 through the voice coil support 121 to suspend the magnetic circuit assembly 122 in the housing 11. In some embodiments, the voice coil 123 may be connected to the voice coil support 121 and extend into a magnetic gap of the magnetic circuit assembly 122. In some embodiments, the voice coil support 121 may include a main body 1211, a first support 1212, and a second support 1213. Merely by way of example, the main body 1211 may be annular, and the first support 1212 and/or the second support 1213 may be cylindrical. The main body 1211 may be connected to the peripheral region of the elastic member 124. The main body 1211 and the elastic member 124 may form an integral structural member by a metal insert injection molding. The main body 1211 may be connected to the front bottom plate 1161 through a glue connection, a snap connection, or the like, or a combination thereof. In some embodiments, one end of the first support 1212 may be connected to the main body 1211, and the voice coil 123 may be connected to the other end of the first support 1212 away from the main body 1211 such that the voice coil may extend into the magnetic circuit assembly 122. Then a portion of the diaphragm 13 may be connected to the magnetic circuit assembly 122, and another portion of the diaphragm 13 may be connected to at least one of the rear housing 115 and the front housing 116.

In some embodiments, one end of the second support 1213 may be connected to the main body 1211. The second support 1213 may surround the first support 1212 and extend laterally to the main body 1211 in a same direction as the first support 1212. In some embodiments, the second support 1213 and the main body 1211 may be connected to the front housing 116 to increase connection strength between the voice coil support 121 and the housing 11. For example, the main body 1211 may be connected to the front bottom plate 1161, and the second support 1213 may be connected to the side plate 1162. Correspondingly, referring to FIG. 4, the second support 1213 may include an escape hole 1214. The escape hole 1214 may communicate with the relief hole 114 to prevent the second support 1213 from blocking the communication between the relief hole 114 and the first cavity 111. Then a portion of the diaphragm 13 may be connected to the magnetic circuit assembly 122, and another portion of the diaphragm 13 may be connected to the other end of the second support 1213 away from the main body 1211 and then connected to the housing 11. In such cases, after the core modules 10 are assembled, the other end of the second support 1213 away from the main body 1211 may press the other portion of the diaphragm 13 on the platform 1153.

In some embodiments, the first support 1212 and/or the second support 1213 may be a continuous and complete structure in a circumferential direction of the voice coil support 121 to increase structural strength of the voice coil support 121, or may be a partially discontinuous structure to avoid other components.

In some embodiments, the transducer 12 may include one or more vibration plates. At least one of one or more vibration plates may be physically connected to the housing 11. At least a portion region of the housing 11 (e.g., the skin contact region) may contact the user's skin (e.g., the skin of the user's head), and when the user wears the acoustic output apparatus, bone-conduction sound waves may be transmitted to the user's cochleae through the skin contact region. In some embodiments, the transducer 12 may include a vibration transmission plate physically connected to at least one vibration plate and the housing 11 to transmit vibrations of the at least one vibration plate to the housing. In some embodiments, at least one of the one or more vibration plates may be an outer wall of the housing 11. In some embodiments, a voice coil 123 may be mechanically connected to the one or more vibration plates. In some embodiments, the voice coil 123 may also be electrically connected to the signal processing module 210. When current (representing a control signal) is introduced into the voice coil 123, the voice coil 123 may vibrate in a magnetic field (e.g., a magnetic field generated by the magnetic circuit assembly 122) and drive the one or more vibration plates to vibrate. The vibrations of the one or more vibration plates 512 may be transmitted to the user's bones through the housing 11 to generate the bone-conduction sound waves. In some embodiments, the vibrations of the one or more vibration plates may cause the housing 11 and/or the magnetic circuit assembly 122 to vibrate. The vibrations of the housing 11 and/or the magnetic circuit assembly 122 may cause the air in the housing 11 to vibrate.

In some embodiments, the magnetic circuit assembly 122 may include one or more magnetic conduction elements (e.g., a magnetic conduction cover 1221) and one or more magnets (e.g., a magnet 1222). The one or more magnetic conduction elements and the one or more magnets may cooperate to form a magnetic field. In some embodiments, the magnetic conduction cover 1221 may include a bottom plate 1223 and a side plate 1224. In some embodiments, the bottom plate 1223 and the side plate 1224 may be integrally formed. In some embodiments, the bottom plate 1223 and the side plate 1224 may be physically connected through, for example, welding, riveting, bonding, or the like. In some embodiments, the magnet 1222 may be disposed in the side plate 1224 and fixed on the bottom plate 1223. A side of the magnet 1222 away from the bottom plate 1223 may be connected to the central region of the elastic member 124 through a connecting member 1225 such that the voice coil 123 may extend into a magnetic gap between the magnet 1222 and the magnetic conduction cover 1221. In some embodiments, a portion of the diaphragm 13 may be connected to the magnetic conduction cover 1221. It should be noted that the magnet 1222 may be a magnet group formed by a plurality of sub-magnets. In addition, in some embodiments, a magnetic conduction plate (not shown in the figure) may also be disposed on the side of the magnet 1222 away from the bottom plate 1223.

Figure 8:
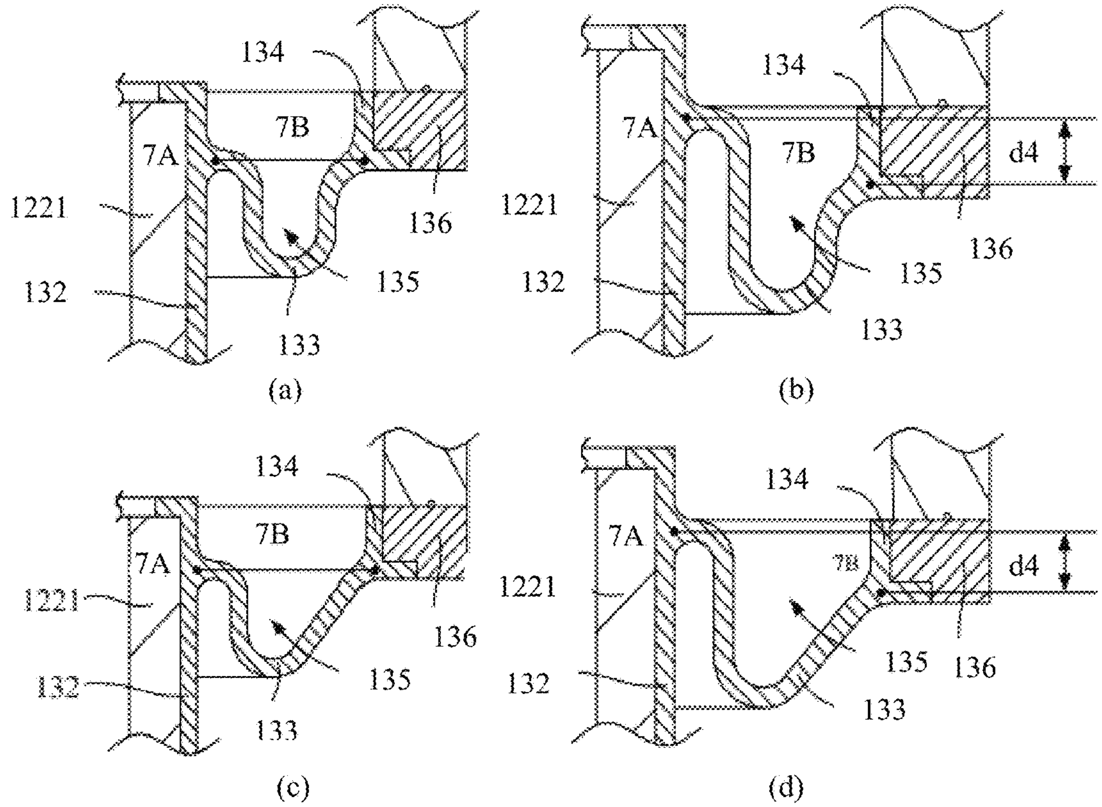
FIG. 8 is a schematic diagram illustrating cross-sections of various exemplary structures of a diaphragm 13 in FIG. 4 according to some embodiments of the present disclosure.

FIG. 8 is a schematic diagram illustrating cross sections of various exemplary structures of the diaphragm 13 in FIG. 4 according to some embodiments of the present disclosure. Referring to FIG. 8, FIG. 7, and FIG. 4, in some embodiments, the diaphragm 13 may include a first connection part 132, a wrinkle part 133, and a second connection part 134. In some embodiments, the first connection part 132, the wrinkle part 133, and the second connection part 134 may be integrally formed. In some embodiments, the first connection part 132 may surround the transducer 12 and be connected to the transducer 12. The second connection part 134 may be connected to the housing 11. The wrinkle part 133 may be located between the first connection part 132 and the second connection part 134 and connect the first connection 132 and the second connection part 134.

Merely by way of example, the first connection part 132 may have a cylindrical shape and may be connected to the magnetic conduction cover 1221; the second connection part 134 may have a shape of a ring and may be connected to the other end of the second support 1213 away from the main body 1211 and then connected to the housing 11. In some embodiments, referring to FIG. 7, a connection point between the wrinkle part 133 and the first connection part 132 may be lower than an end surface of the side plate 1224 away from the bottom plate 1223.

In some embodiments, the first connection part 132 may include a bottom plate and a side wall. The bottom plate of the first connection part 132 may cover a bottom of the transducer 12, and the side wall of the first connection part 132 may cover a side surface of the transducer 12 or cover at least a portion of the side surface of the transducer 12. In some embodiments, the bottom plate of the first connection part 132 may include holes or stripe gaps.

In some embodiments, the wrinkle part 133 may form a concave region 135 between the first connection part 132 and the second connection part 134 such that the first connection part 132 and the second connection part 134 may more easily move relative to each other in a vibration direction of the transducer 12, thereby reducing the influence of the diaphragm 13 on the transducer 12. In some embodiments, the concave region 135 may be sunken towards the second cavity 112A. In some embodiments, the concave region 135 may be sunken towards the first cavity 111, i.e., a concave direction of the concave region 135 may be opposite to a concave direction of the concave region 135 in FIG. 4, and the concave region may also be referred to as a convex region.

Regarding FIG. 8, (a)-(d) in FIG. 8 illustrate various variations of the diaphragm 13. Main differences among the variations may lie in a specific structure of the wrinkle part 133. As shown in (a) of FIG. 8, the wrinkle part 133 may include a symmetrical structure, and a connection point between one end of the wrinkle part 133 and the first connection part 132 (or referred to as a first connection point) and a connection point between another end of the wrinkle part 133 and the second connection part 134 (or referred to as a second connection point) may be coplanar. For example, projections of the two connection points in the vibration direction of the transducer 12 may coincide. As shown in (b) of FIG. 8, most of the wrinkle part 133 may have a symmetrical structure, and the connection point between one end of the wrinkle part 133 and the first connection part 132 and the connection point between the other end of the wrinkle part 133 and the second connection part 134 may not be coplanar. For example, the projections of the two connection points in the vibration direction of the transducer 12 may be separated from each other. As shown in (c) of FIG. 8, the wrinkle part 133 may have an asymmetric structure, and the connection point between one end of the wrinkle part 133 and the first connection part 132 and the connection point between the other end of the wrinkle part 133 and the second connection part 134 may be coplanar. As shown in (d) of FIG. 8, the wrinkle part 133 may have an asymmetric structure, and the connection point between one end of the wrinkle part 133 and the first connection part 132 and the connection point between the other end of the wrinkle part 133 and the second connection part 134 may not be coplanar.

In some embodiments, there may be a plurality of concave regions 135, such as two or three concave regions 135, and the concave regions 135 may be distributed at intervals in a vertical direction of the vibration direction of the transducer 12; depths of the concave regions 135 in the vibration direction of the transducer 12 may be the same or different.

In some embodiments, a material of the diaphragm 13 may include polycarbonate (PC), polyamides (PA), an acrylonitrile butadiene styrene copolymer (ABS), polystyrene (PS), high impact polystyrene (HIPS), polypropylene (PP), polyethylene terephthalate (PET), polyvinyl chloride (PVC), polyurethanes (PU), polyethylene (PE), phenol formaldehyde (PF), urea-formaldehyde resin (UF), melamine-formaldehyde resin (MF), polyarylate (PAR), polyetherimide (PEI), polyimide (PI), polyethylene naphthalate (PEN), polyetheretherketone (PEEK), silica gel, or the like, or any combination thereof. PET is a thermoplastic polyester with a good molding property. A diaphragm made of PET may be referred to as a Mylar film; PC may have strong impact resistance and stable size after molding; PAR is an advanced version of PC, which is mainly used for environmental purposes; PEI is softer than PET and has higher internal damping; PI has high temperature resistance, higher molding temperature and longer processing time; PEN has high strength and is relatively hard, and can be painted, dyed, and plated; PU is often used in a damping layer or ring of composite materials, with high elasticity and high internal damping; and PEEK is a new material with properties of friction resistance and fatigue resistance. It should be noted that the composite materials may generally include the characteristics of various materials, such as a double-layer structure (hot-pressed PU with increased internal resistance), a three-layer structure (a sandwich structure with an intermediate damping layer PU, acrylic glue, UV adhesive, or pressure-sensitive adhesive), and a five-layer structure (two layers of film bonded by double-sided adhesive, and the double-sided adhesive having a base layer (usually made of PET)).

In some embodiments, the air-conduction acoustic assembly may further include a reinforcing member. In some embodiments, the reinforcing member may include a reinforcing ring 136. A hardness of the reinforcing ring 136 may be greater than a hardness of the diaphragm 13. In some embodiments, the reinforcing ring 136 may have a shape of a ring, a ring width of the reinforcing ring 136 may be greater than or equal to 0.4 mm, and a thickness of the reinforcing ring 136 may be less than or equal to 0.4 mm. In some embodiments, the reinforcing ring 136 may be connected to the second connection part 134 such that the second connection part 134 may be connected to the housing 11 through the reinforcing ring 136. In such cases, structural strength of an edge of the diaphragm 13 may be increased, thereby increasing connection strength between the diaphragm 13 and the housing 11.

It should be noted that the reinforcing ring 136 having the shape of a ring is mainly used to facilitate adaptation to the annular structure of the second connection 134. In some embodiments, the reinforcing ring 136 may be either a continuous and complete ring or a discontinuous and segmented ring. In some embodiments, after the core modules 10 are assembled, the other end of the second support 1213 away from the main body 1211 may press the reinforcing ring 136 on the platform 1153.

In some embodiments, the first connection part 132 may be injection-molded on an outer peripheral surface of the magnetic conduction cover 1221, and the reinforcing ring 136 may also be injection-molded on the second connection part 134 such that a connection mode between the first connection part 132 and the reinforcing ring 136 may be simplified, and the connection strength between the first connection part 132 and the reinforcing ring 136 may be increased. The first connection part 132 may cover the side plate 1224, and may further cover the bottom plate 1223 to increase a contact area between the first connection part 132 and the magnetic circuit assembly 122, thereby increasing the connection strength between the first connection part 132 and the magnetic circuit assembly 122. Similarly, the second connection part 134 may be connected to an inner ring surface and one end surface of the reinforcing ring 136 to increase a contact area between the second connection part 134 and the reinforcing ring 136, thereby increasing the connection strength between the second connection part 134 and the reinforcing ring 136.

In some embodiments, for the diaphragm 13, under the premise that the diaphragm 13 has a certain structural strength to ensure its basic structure, fatigue resistance, and other performances, the softer the diaphragm 13, the more likely the diaphragm 13 is to elastically deform, and the less influence on the transducer 12.

Figure 9:
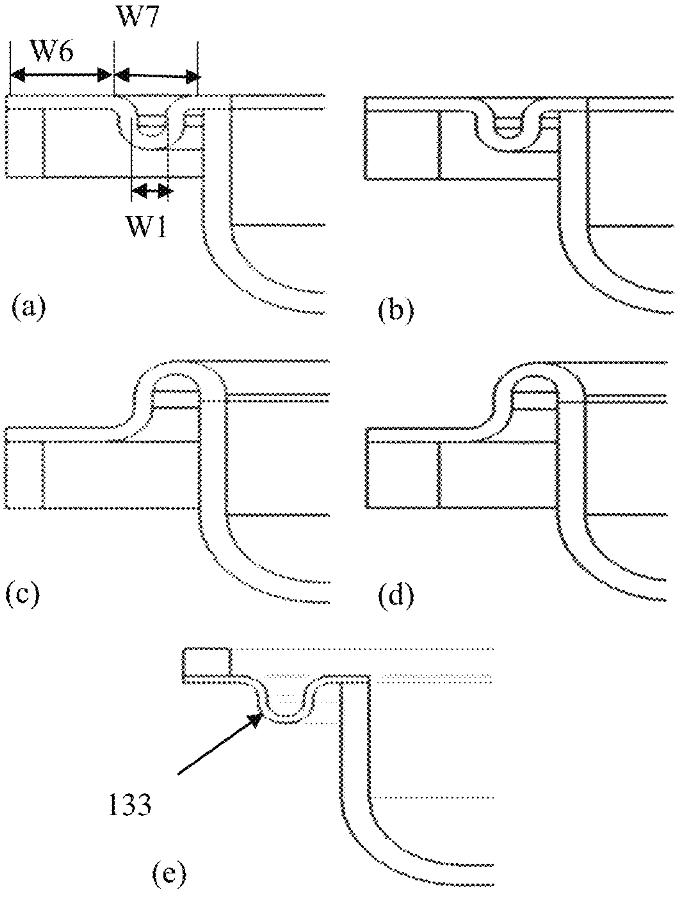
FIG. 9 is a schematic diagram illustrating cross-sections of various exemplary structures of the diaphragm 13 in FIG. 4 according to some embodiments of the present disclosure.

FIG. 9 is a schematic diagram illustrating cross sections of various exemplary structures of the diaphragm 13 in FIG. 4 according to some embodiments of the present disclosure. Diagrams (a)-(e) in FIG. 9 illustrate various structural variations of the diaphragm 13, the main difference of those variations lies in a specific structure and size of the wrinkle part 133. In some embodiments, parameters of the specific structure and the size of (a)-(e) may be shown in the following table:

| No. | Wrinkle thick-ness | Shape | Fixed region size | Wrinkle width | Half-depth width | Wrinkle radius |
|---|---|---|---|---|---|---|
| (a) | 0.2 mm | Concave | 0.4 mm | 1.7 mm | 0.7 mm | 0.35 mm |
| (b) | 0.2 mm | Concave | 0.8 mm | 1.3 mm | 0.7 mm | 0.35 mm |
| (c) | 0.2 mm | Convex | 0.4 mm | 1.7 mm | 1.0 mm | 0.5 mm |
| (d) | 0.2 mm | Convex | 0.8 mm | 1.3 mm | 1.0 mm | 0.5 mm |
| (e) | 0.1 mm | Concave | 0.4 mm | 1.7 mm | 0.7 mm | 0.35 mm |

In the above table, a wrinkle thickness may refer to a thickness (e.g., an average thickness) of the wrinkle part 133, a shape may refer to a direction (e.g., a convex region or a concave region in FIG. 8) of the wrinkle part 133, a fixed region size may refer to a width (e.g., W6 in FIG. 9(*a*)) of the diaphragm 13 fixed on the housing 11, a wrinkle width may refer to a total width (e.g., W7 in FIG. 9(*a*)) of the wrinkle part 133, a half-depth width (i.e., W1 in FIG. 9(*a*) and description hereinafter) may refer to a width of the wrinkle part 133 at ½ depth of the winkle part 133, and a wrinkle radius may refer to an arc radius of the wrinkle part 133 (e.g., an arc radius of a fifth transition segment 1335 described hereinafter), wherein the wrinkle radius may be equal to half of the half-depth width.

In some embodiments, the diaphragm 13 may deform and/or displace during vibrations, and the deformation and/or displacement may cause the diaphragm 13 to have different elastic coefficients at different positions. For diaphragms 13 with different structures and sizes, the elastic coefficients may vary with the displacement.

Figure 10:
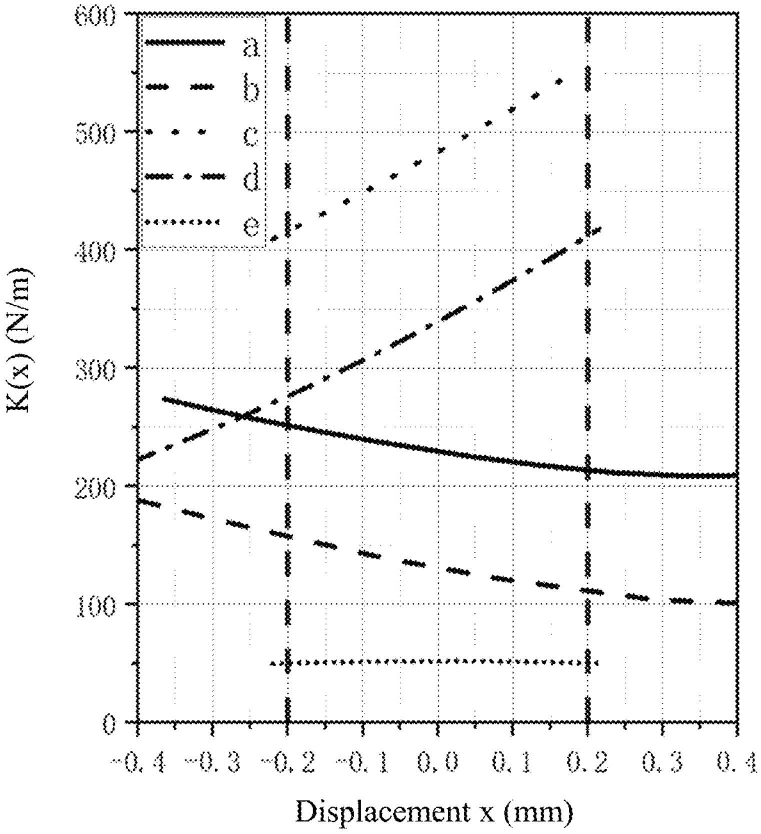
FIG. 10 is a graph illustrating variations of an elastic coefficient of the diaphragm 13 of different structures in FIG. 9 with displacements according to some embodiments of the present disclosure.

FIG. 10 is a graph illustrating variations of an elastic coefficient of the diaphragm 13 of different structures in FIG. 9 with the displacements according to some embodiments of the present disclosure. As shown in FIG. 10, an abscissa may represent displacement x of the diaphragm 13, and an ordinate may represent an elastic coefficient K(x) of the diaphragm 13. The elastic coefficient K(x) may vary with the displacement. That is to say, an elasticity of the diaphragm 13 may be nonlinear. In some embodiments, the elastic coefficient of the diaphragm 13 may be stable without varying with the displacement by setting parameters such as a structure and a size of the diaphragm 13, thereby obtaining the diaphragm 13 with relatively stable vibrations. For example, according to the above table and FIG. 10, when a thickness of the diaphragm 13 is relatively large, the elastic coefficient of the diaphragm 13 may vary significantly with the displacement, and nonlinearity of the diaphragm 13 may be significant; when the thickness of the diaphragm 13 is small, the elastic coefficient of the diaphragm 13 may be relatively stable, and the nonlinearity may not be significant. Therefore, in some embodiments, the thickness of the diaphragm 13 may be less than or equal to 0.2 mm. In some embodiments, the thickness of the diaphragm 13 may be less than or equal to 0.1 mm. In some embodiments, elastic deformation of the diaphragm 13 may mainly occur at the wrinkle part 133. In such cases, in some embodiments, the thickness of the wrinkle part 133 may be less than the thickness of other parts of the diaphragm 13. Accordingly, the thickness of the wrinkle part 133 may be less than or equal to 0.2 mm. In some embodiments, the thickness of the wrinkle part 133 may be less than or equal to 0.1 mm. As another example, according to the above table and FIG. 10, when a direction of the wrinkle part 133 is concave, the elastic coefficient of the diaphragm 13 may be relatively stable. In such cases, in some embodiments, the direction of the wrinkle part 133 may be concave. In some embodiments, other parameters of the diaphragm 13 may also be determined based at least in part on the nonlinearity of the diaphragm 13, such as a fixed region width, a wrinkle width, a half-depth width, a wrinkle radius, or the like.

Figure 11:
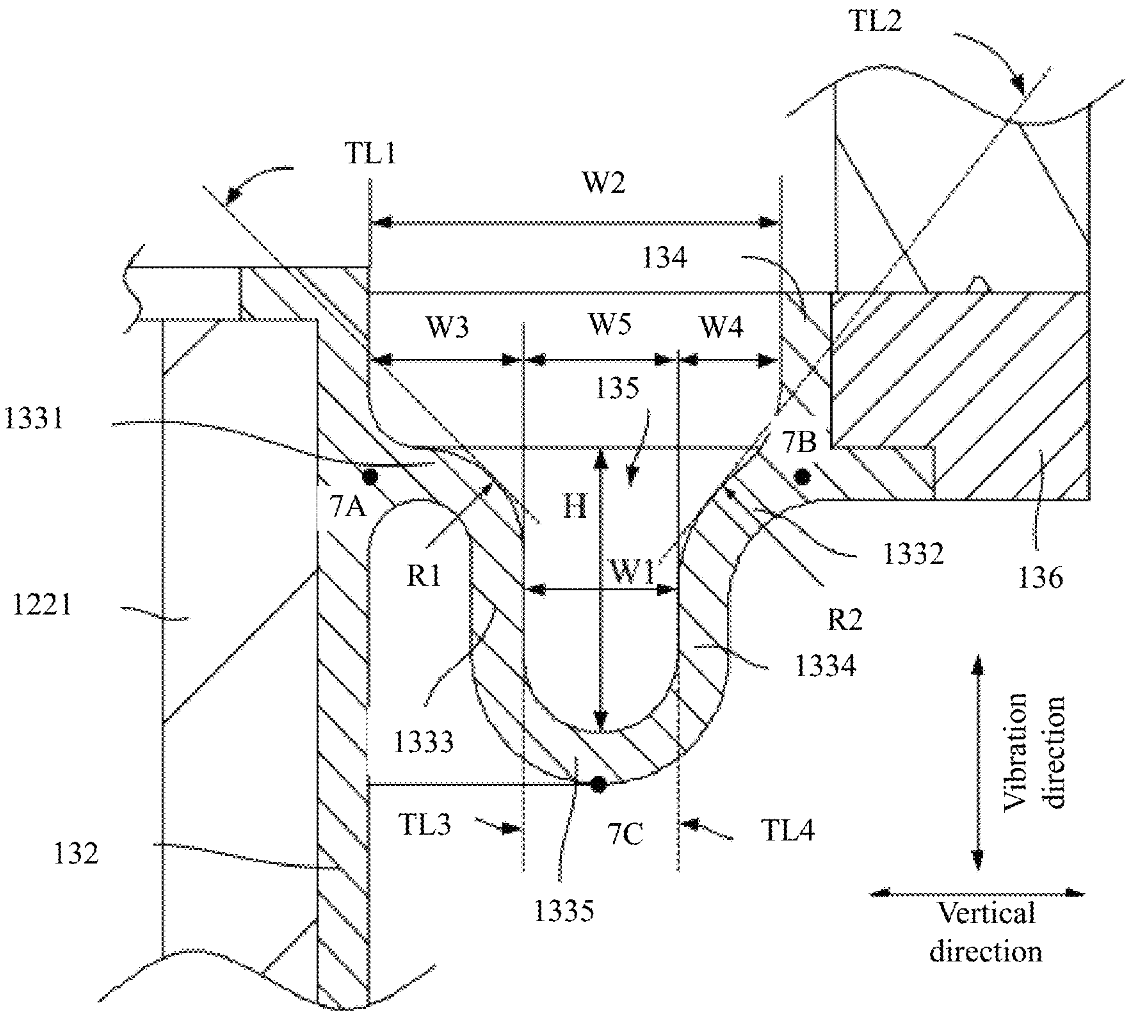
FIG. 11 is a schematic diagram illustrating a cross-section of an exemplary structure of the diaphragm 13 in FIG. 4 according to some embodiments of the present disclosure.

FIG. 11 is a schematic diagram illustrating a cross-section of an exemplary structure of the diaphragm 13 in FIG. 4 according to some embodiments of the present disclosure. As shown in FIG. 11, in some embodiments, the concave region 135 may have a first depth H in a vibration direction of a transducer 12; in a direction perpendicular to the vibration direction of the transducer 12, the concave region 135 may have a half-depth width W1, and a first spacing distance W2 is between the first connection part 132 and the second connection part 134. The half-depth width W1 may refer to a width of the concave region 135 at a depth of ½

H. In some embodiments, W1 and W2 may satisfy the following relationship: 0.2≤W1/W2≤0.6, which may not only ensure a size of a deformable region of the wrinkle part 133, but also avoid structural interference between the wrinkle part 133 and the first connection part 132 and/or the housing 11. In some embodiments, W1 and W2 may satisfy the following relationship: 0.3≤W1/W2≤0.5. In some embodiments, H and W2 may satisfy the following relationship: 0.2≤H/W2≤1.4, which may not only ensure a size of a deformable region of the wrinkle part 133, making the wrinkle part 133 soft enough, but also avoid structural interference between the wrinkle part 133 and the first connection part 132 and/or the housing 11, and further prevent the wrinkle part 133 from being difficult to vibrate due to excessive weight. In some embodiments, H and W2 may satisfy the following relationship: 0.4≤H/W2≤1.2. In some embodiments, H and W2 may satisfy the following relationship: 0.6≤H/W2≤1. In some embodiments, H and W2 may satisfy the following relationship: 0.8≤H/W2≤9.

In some embodiments, the wrinkle part 133 may include a first transition segment 1331, a second transition segment 1332, a third transition segment 1333, a fourth transition segment 1334, and a fifth transition segment 1335. One end of the first transition segment 1331 and one end of the second transition segment 1332 may be connected to the first connection part 132 and the second connection part 134, respectively, and extend toward each other. One end of the third transition segment 1333 and one end of the fourth transition segment 1334 may be connected to the other end of the first transition segment 1331 and the other end of the second transition segment 1332, respectively. Two ends of the fifth transition segment 1335 may be connected to the other end of the third transition segment 1333 and the other end of the fourth transition segment 1334, respectively. Then the transition segments may be jointly enclosed to form the concave region 135. In some embodiments, in a direction from a connection point (e.g., a point 7A) between the first transition segment 1331 and the first connection part 132 to a reference position point of the wrinkle part 133 farthest from the first connection part 132 (i.e., a vertex of the wrinkle part 133, e.g., a point 7C), an included angle between a tangent line (e.g., a dotted line TL1) of a side of the first transition segment 1331 facing the concave region 135 and a vibration direction of the transducer 12 may decrease gradually; in a direction from a connection point (e.g., a point 7B) between the second transition segment 1332 and the second connection part 134 to the reference position point, an included angle between a tangent line (e.g., a dotted line TL2) of a side of the second transition segment 1332 facing the concave region 135 and the vibration direction of the transducer 12 may decrease gradually. In such cases, the concave region 135 may be sunken towards the second cavity 112A. In some embodiments, an included angle between a tangent line (e.g., a dotted line TL3) of a side of the third transition segment 1333 facing the concave region 135 and the vibration direction of the transducer 12 may remain constant or increase gradually; an included angle between the tangent line (e.g., a dotted line TL4) of a side of the fourth transition segment 1334 facing the concave region 135 and the vibration direction of the transducer 12 may remain constant or increase gradually. The fifth transition segment 1335 may have a shape of an arc.

In some embodiments, the fifth transition segment 1335 may have a shape of an arc (e.g., a circular arc), and a radius of the arc may be greater than or equal to 0.2 mm. In some embodiments, the radius of the arc may be in a range of 0.2 mm-0.5 mm. In some embodiments, the radius of the arc may be in a range of 0.3 mm-0.4 mm. In some embodiments, referring to (a) or (b) in FIG. 8, the included angle between the tangent line of the side of the third transition segment 1333 facing the concave region 135 and the vibration direction of the transducer 12 may be zero; the included angle between the tangent line of the side of the fourth transition segment 1334 facing the concave region 135 and the vibration direction of the transducer 12 may be zero. In such cases, an arc radius of the fifth transition segment 1335 may be equal to a half of the half-depth width W1 of the concave region 135. Referring to (c) or (d) in FIG. 8, the included angle between the tangent line of the side of the third transition segment 1333 facing the concave region 135 and the vibration direction of the transducer 12 may be zero; the included angle between the tangent line of the side of the fourth transition segment 1334 facing the concave region 135 and the vibration direction of the transducer 12 may be a fixed value greater than zero. In such cases, the fourth transition segment 1334 may be tangent to the fifth transition segment 1335.

In some embodiments, the first transition segment 1331 and the second transition segment 1332 may respectively have a shape of an arc. In some embodiments, an arc radius R1 of the first transition segment 1331 may be greater than or equal to 0.2 mm, and an arc radius R2 of the second transition segment 1332 may be greater than or equal to 0.2 mm, which may avoid excessive local bending of the wrinkle part 133, thereby increasing reliability of the diaphragm 13. In some embodiments, the arc radius R1 may be in a range of 0.2 mm-0.4 mm. In some embodiments, the arc radius R1 may be in a range of 0.2 mm-0.25 mm. In some embodiments, the arc radius R2 may be in a range of 0.2 mm-0.4 mm. In some embodiments, the arc radius R2 may be in a range of 0.2 mm-0.25 mm. In some embodiments, the first transition segment 1331 may include an arc segment and a flat segment connected to each other. The arc segment of the first transition segment 1331 may be connected to the third transition segment 1333, and the flat segment of the first transition segment 1331 may be connected to the first connection part 132; the second transition segment 1332 may be similar to the first transition segment 1331.

In some embodiments, a projection of a length of the first transition segment 1331 in a vertical direction of the vibration direction of the transducer 12 may be defined as a first projection length W3, a projection of a length of the second transition segment 1332 in the vertical direction may be defined as a second projection length W4, and a projection of a length of the fifth transition segment 1335 in the vertical direction may be defined as a third projection length W5, wherein W3, W4, and W5 may satisfy the following relationship: 0.4≤(W3+W4)/W5≤2.5. In some embodiments, W3, W4, and W5 may satisfy the following relationship: 0.5≤(W3+W4)/W5≤2.2. In some embodiments, W3, W4, and W5 may satisfy the following relationship: 0.8≤(W3+W4)/W5≤2. In some embodiments, W3, W4, and W5 may satisfy the following relationship: 1≤(W3+W4)/W5≤1.5.

According to the above description and FIG. 11, in some embodiments, a thickness of the diaphragm 13 may be 0.1 mm. In some embodiments, W2>0.9 mm. In some embodiments 0.9 mm≤W2≤1.7 mm. In some embodiments, 1.1 mm≤W2≤1.5 mm. In some embodiments, 1.2 mm≤W2≤1.4 mm. In some embodiments, 0.3 mm≤H≤1.0 mm. In some embodiments, 0.5 mm≤H≤0.9 mm. In some embodiments, 0.6 mm≤H≤0.8 mm. In some embodiments, W3+W4≥0.3 mm. Further, in some embodiments, when 0.3 mm≤W3+W4≥1.0 mm, W1 or W5≥0.4 mm. In some embodiments, when $0.4\ mm \le W3+W4 \ge 0.7\ mm$, W1 or $W5 \ge 0.5$ mm. In a specific embodiment, W1 or W5=0.4 mm, W3=0.42 mm, W4=0.45 mm, H=0.55 mm.

Referring to FIG. 11 and FIG. 7, in some embodiments, in the vibration direction of the transducer 12, a distance from the connection point (e.g., the point 7A) between the wrinkle part 133 and the first connection part 132 to an outer end surface of the magnetic circuit assembly 122 away from a first cavity 111 may be defined as a first distance d1, and a distance from a central region of an elastic member 124 to the outer end surface of the magnetic circuit assembly 122 away from the first cavity 111 may be defined as a second distance d2, wherein d1 and d2 may satisfy the following relationship: $0.3 \le d1/d2 \le 0.8$. In some embodiments, d1 and d2 may satisfy the following relationship: $0.4 \le d1/d2 \le 0.7$. In some embodiments, d1 and d2 may satisfy the following relationship: $0.5 \le d1/d2 \le 0.6$. In such cases, since the distance d2 can be determined, the distance d1 may be adjusted based on the distance d2 to adjust a specific position where the wrinkle part 133 is connected to the first connection part 132. In some embodiments, a distance from a center of gravity (e.g., a point G) of the magnet 1222 to the outer end surface of the magnetic circuit assembly 122 away from the first cavity 111 may be defined as a third distance d3, wherein d1 and d3 may satisfy the following relationship: $0.7d1/d3 \le 2$. In some embodiments, d1 and d3 may satisfy the following relationship: $1 \le d1/d3 \le 1.6$. In some embodiments, d1 and d3 may satisfy the following relationship: $1.3 \le d1/d3 \le 1.5$. Since the distance d3 can be determined, the size of the distance d1 may be adjusted based on the distance d3 to adjust the specific position where the wrinkle part 133 is connected to the first connection part 132. In such cases, one end of the magnetic circuit assembly 122 may be connected to the housing 11 through the elastic member 124 and the voice coil support 121, and the other end of the magnetic circuit assembly 122 may be connected to the housing 11 through the diaphragm 13, i.e., the elastic member 124 and the diaphragm 13 may respectively fix the two ends of the magnetic circuit assembly 122 on the housing 11 in the vibration direction of the transducer 12 such that the stability of the magnetic circuit assembly 122 may be improved significantly.

In some embodiments, the first distance may be greater than the third distance (i.e., $d1 \ge d3$), and in the vibration direction of the transducer 12, referring to FIG. 4, the sound hole 113 may be at least partially located between the connection point (e.g., a point 7B) and the outer end surface, which may not only increase the stability of the magnetic circuit component 122 as much as possible, but also reserve a sufficient space for the second cavity 112A to improve the acoustic performance of the core modules 10, and further provide enough design space for a position and size of the sound hole 113 on the housing 11 as much as possible to facilitate flexible setting of the sound hole 113. In some embodiments, the first distance may be less than the third distance (i.e., $d1 < d3$), the center of gravity (e.g., the point G) of the magnet 1222 may be between the elastic member 124 and the diaphragm, thereby improving the stability of the magnetic circuit assembly 122.

According to the above descriptions and FIG. 7, taking a surface of a bottom plate 1223 away from a side plate 1224 as a reference, the distance d1 may also be regarded as a distance between the second connection part 134 and the bottom plate 1223, the distance d2 may also be regarded as a distance between the elastic component 124 and the bottom plate 1223, and the distance d3 may also be regarded as a distance between the center of gravity of the magnet 1222 and the bottom plate 1223. In one embodiment, d1=2.85 mm, d2=4.63 mm, d3=1.78 mm.

In some embodiments, a distance between projections of the connection point (e.g., the point 7A) between the first connection part 132 and the wrinkle part 133 and the connection point (e.g., the point 7B) between the second connection part 134 and the wrinkle part 133 in the vibration direction of the transducer 12 may be defined as a first projection distance d4, wherein d4 and W2 may satisfy the following relationship: $0 \le d4/W2 \le 1.8$. In some embodiments, d4 and W2 may satisfy the following relationship: $0.5 \le d4/W2 \le 1.5$. In some embodiments, d4 and W2 may satisfy the following relationship: $0.8 \le d4/W2 \le 1.2$. Accordingly, the specific position where the wrinkle part 133 is connected to the first connection part 132 may be adjusted. In some embodiments, referring to (a) or (c) in FIG. 8, the projection of the connection point between the first connection part 132 and the wrinkle part 133 and the projection of the connection point between the second connection part 134 and the wrinkle part 133 in the vibration direction of the transducer 12 may coincide, i.e., d4=0. In some embodiments, referring to (b) or (d) in FIG. 8, the projection of the connection point (e.g., the point 7A) between the first connection part 132 and the wrinkle part 133 and the projection of the connection point (e.g., the point 7B) between the second connection part 134 and the wrinkle part 133 in the vibration direction of the transducer 12 may be separated, i.e., d4>0.

It should be noted that the above description of the diaphragm 13 is provided for the purpose of illustration only, and is not intended to limit the scope of the present disclosure. Those skilled in the art may make various variations and modifications based on the description of the present disclosure. However, these alterations and modifications do not depart from the scope of the present disclosure. For example, the diaphragm 13 may also be between a bottom surface of the bone-conduction acoustic assembly 221 (or the transducer 12) and a bottom surface of the housing 11. As another example, the air-conduction acoustic assembly 222 may include a first diaphragm and a second diaphragm. The first diaphragm may be similar to the diaphragm 13. The second diaphragm may be connected to the housing 11 and vibrate with the vibration of the housing 11. As another example, the air-conduction acoustic assembly 222 may include a diaphragm and a vibration transmission component. The vibration transmission component may connect the bone-conduction acoustic assembly 221 and the diaphragm. The vibration transmission component may be configured to transmit the vibrations of the bone-conduction acoustic assembly 221 to the diaphragm to generate air-conduction sound waves.

Figure 12:
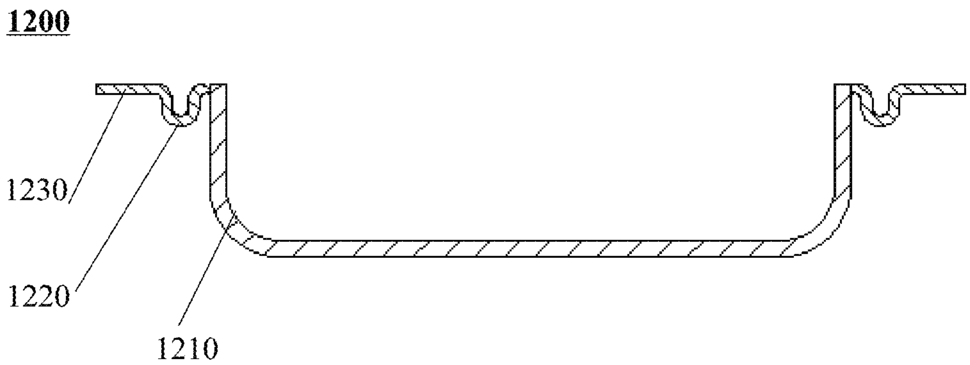
FIG. 12 is a schematic diagram illustrating a cross-section of an exemplary diaphragm according to some embodiments of the present disclosure.

FIG. 12 is a schematic diagram illustrating a cross-section of an exemplary diaphragm according to some embodiments of the present disclosure. As shown in FIG. 12, the diaphragm 1200 may include a first connection part 1210, a wrinkle part 1220, and a second connection part 1230. In some embodiments, the second connection part 1230 may be flush with a top of the first connection part 1210. In some embodiments, the second connection part 1230 may not be flush with the top of the first connection part 1210. The wrinkle part 1220 may be recessed towards a second cavity (i.e., a direction of a bottom plate of the first connection part 1210). In some embodiments, an elastic coefficient of the diaphragm 1200 may be adjusted by adjusting characteristics of the diaphragm 1200. For example, the elastic coefficient of the diaphragm 1200 may be adjusted by adjusting a height of the first connection part 1210, a height of the second connection 1230 relative to the first connection part 1210, a height of the wrinkle part 1220, a thickness of the first connection 1210 and/or a thickness of the second connection 1230, etc. For example, the higher the height of the wrinkle part 1220, the smaller the thickness of the second connection part 1230, and the more the wrinkle part 1220, the greater the elastic coefficient of the diaphragm 1200.

Figure 13:
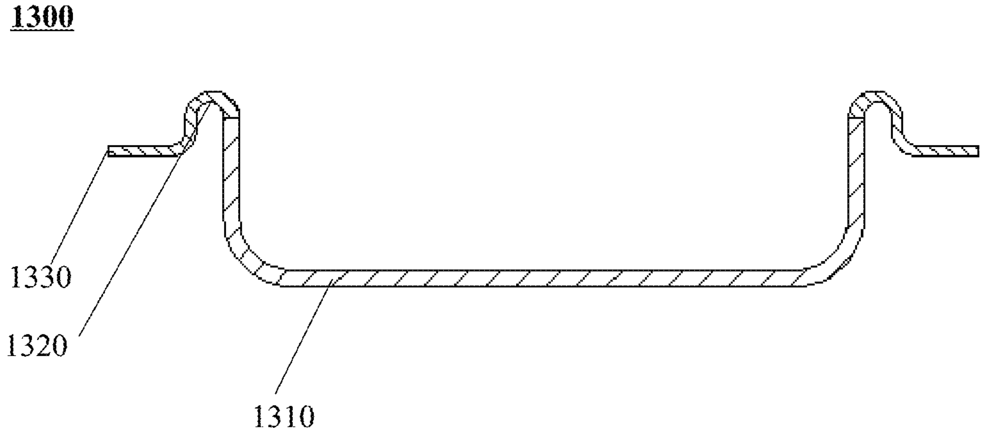
FIG. 13 is a schematic diagram illustrating a cross-section of an exemplary diaphragm according to some embodiments of the present disclosure.

FIG. 13 is a schematic diagram illustrating a cross-section of an exemplary diaphragm according to some embodiments of the present disclosure. A diaphragm 1300 in FIG. 13 may be similar to the diaphragm 1200 in FIG. 12. For example, the diaphragm 1300 may include a first connection part 1310, a wrinkle part 1320, and a second connection part 1330. Different from the diaphragm 1200, the wrinkle part 1320 may protrude towards a first cavity (i.e., a direction opposite to a bottom plate of the first connection 1310). In some embodiments, an elastic coefficient of the diaphragm 1300 may be adjusted by adjusting characteristics of the diaphragm 1300. For example, the elastic coefficient of the diaphragm 1300 may be adjusted by adjusting a height of the first connection 1310, a height of the second connection 1330 relative to the first connection part 1310, a height of the wrinkle part 1320, a thickness of the first connection part 1310 and/or a thickness of the second connection part 1330, etc. For example, the higher the height of the wrinkle part 1320, the smaller the thickness of the second connection part 1330, and the more the wrinkle part 1320, the greater the elastic coefficient of the diaphragm 1300.

Comparing the diaphragm 1200 in FIG. 12 and the diaphragm 1300 in FIG. 13, when the diaphragm 1200 and the diaphragm 1300 include a same material, the diaphragm 1200 may have a smaller elastic coefficient and a smaller low-frequency resonance frequency than the diaphragm 1300.

In some embodiments, the diaphragm 1200 (e.g., the wrinkle part 1220) and/or the diaphragm 1300 (e.g., the wrinkle part 1320) may include through holes (not shown). The first cavity 111 and the second cavity 112A of the acoustic output apparatus may communicate through the through holes. In some embodiments, phases of sounds generated at both ends of the through holes may be opposite and the sounds at both ends of the through holes may cancel each other such that sound leakage (e.g., the sound leaked from the relief hole 144) generated by the acoustic output apparatus may be effectively reduced, and the acoustic performance of the acoustic output apparatus may be enhanced.

Figure 14:
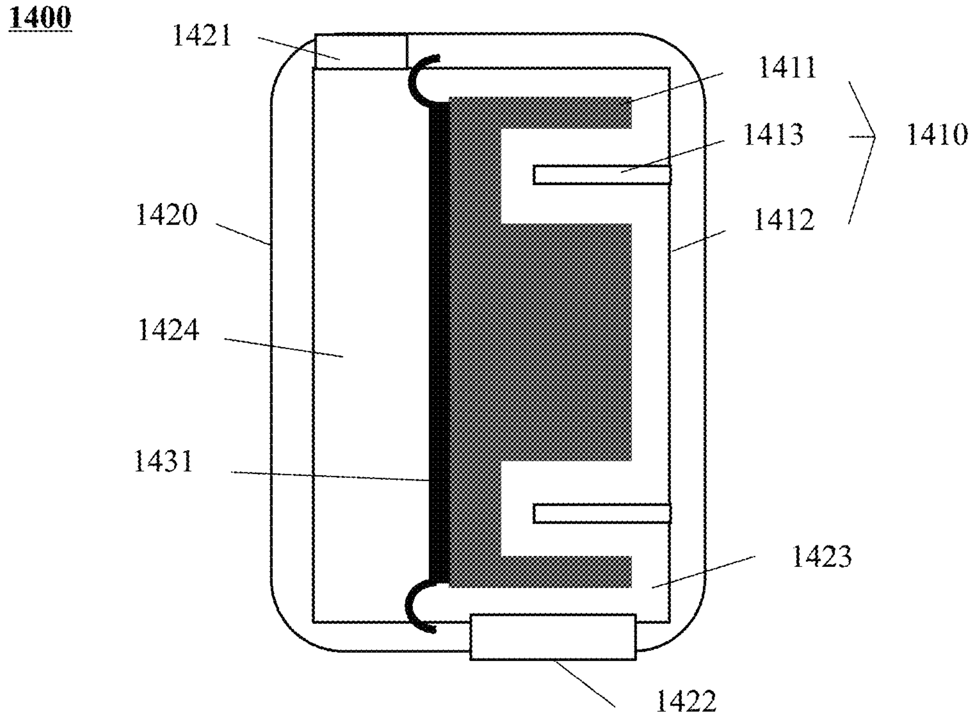
FIG. 14 is a schematic diagram illustrating an acoustic output apparatus according to some embodiments of the present disclosure.

FIG. 14 is a schematic diagram illustrating an acoustic output apparatus according to some embodiments of the present disclosure. As shown in FIG. 14, the acoustic output apparatus 1400 may include a bone-conduction acoustic assembly 1410, a housing 1420, and an air-conduction acoustic assembly. The bone-conduction acoustic assembly 1410 and the air-conduction acoustic assembly may be accommodated together in an accommodation chamber of the housing 1420. The bone-conduction acoustic assembly 1410 may include a magnetic circuit assembly 1411, one or more vibration plates 1412, and a voice coil 1413. The magnetic circuit assembly 1411 may include one or more magnetic elements and/or magnetic conduction elements, which may be configured to generate a magnetic field. The voice coil 1413 may be disposed in a magnetic gap of the magnetic circuit assembly 1411. At least one of the one or more vibration plates 1412 may be physically connected to the housing 1420. The housing 1420 may be in contact with a user's skin (e.g., skin of the user's head) and transmit bone-conduction sound waves to the cochleae. The air-conduction acoustic assembly may include a diaphragm 1431. The diaphragm 1431 may be physically connected to the bone-conduction acoustic assembly 1410 and/or the housing 1420. For example, as shown in FIG. 14, the diaphragm 1431 may be located between a bottom surface of the bone-conduction acoustic assembly 1410 and a bottom surface of the housing 1420, and separate the accommodating chamber into a first cavity 1423 and a second cavity 1424. When the bone-conduction acoustic assembly 1410 (e.g., one or more vibration plates) vibrates to generate bone-conduction sound waves, vibrations of the bone-conduction acoustic assembly 1410 may drive the housing 1420 and/or the diaphragm 1431 physically connected to the bone-conduction acoustic assembly 1410 and/or the housing 1420 to vibrate.

The vibration of the diaphragm 1431 may cause the air in the housing 1420 to vibrate, thereby generating the air-conduction sound waves. The air-conduction sound waves may be transmitted to the outside of the housing 1420 through a sound hole 1421. The air-conduction sound waves and the bone-conduction sound waves may represent a same audio signal. In some embodiments, the air-conduction sound waves and the bone-conduction sound waves representing the same audio signal may refer to the air-conduction sound waves and the bone-conduction sound waves representing a same voice content, which may consist of frequency components of air-conduction sound waves and bone-conduction sound waves. The frequency components of the air-conduction sound waves and the bone-conduction sound waves may be different. For example, the bone-conduction sound waves may include more low-frequency components, and the air-conduction sound waves may include more high-frequency components.

In some embodiments, the air-conduction sound waves and the bone-conduction sound waves may have a same phase, i.e., a phase difference between the air-conduction sound waves and the bone-conduction sound waves may be equal to zero. In some embodiments, the phase difference between the air-conduction sound waves and the bone-conduction sound waves may be less than a threshold, such as Tr, $2\pi/3$, $\pi/2$, or the like. The phase difference may refer to an absolute value of a phase difference between the bone-conduction sound waves and the air-conduction sound waves. In some embodiments, different frequency ranges of the air-conduction sound waves and the bone-conduction sound waves may correspond to different phase differences and different thresholds. For example, in a frequency range less than 300 Hz, the phase difference between the air-conduction sound waves and the bone-conduction sound waves may be less than Tr. As another example, in a frequency range less than 1000 Hz (e.g., 300 Hz-1000 Hz), the phase difference between the air-conduction sound waves and the bone-conduction sound waves may be less than $2\pi/3$. As another example, in a frequency range less than 3000 Hz (e.g., 1000 Hz-3000 Hz), the phase difference between the air-conduction sound waves and the bone-conduction sound waves may be less than $\pi/2$. In such cases, synchronization of the bone-conduction sound waves and the air-conduction sound waves may be increased such that overlap between the bone-conduction sound waves and the air-conduction sound waves may be increased, which may improve the listening effect. In some embodiments, a time difference between the air-conduction sound waves and the bone-conduction sound waves received by a user may be less than a threshold, e.g., 0.1 seconds.

In some embodiments, the housing 1420 may include a relief hole 1422. For example, the relief hole 1422 may be disposed on a side wall of a first part of the housing 1420. A first cavity 1423 may be in flow communication with an outside of the acoustic output apparatus 1400 via the relief hole 1422. As another example, the relief hole 1422 and the sound hole 1421 may be disposed on different side walls of the housing 1420. As another example, the relief hole 1422 and the sound hole 1421 may be respectively disposed on side walls of the housing 1420 that are not adjacent (e.g., parallel to each other).

In some embodiments, output characteristics of the bone-conduction acoustic waves may be adjusted by adjusting a stiffness (e.g., a structural dimension, a material elastic modulus, etc.) of the bone-conduction acoustic assembly 1410 (e.g., a vibration plate) and/or the housing 1420.

In some embodiments, the output characteristics of the air-conduction sound waves may be adjusted by adjusting a shape, an elastic coefficient, and damping of the diaphragm 1431. The output characteristics of the air-conduction sound waves may also be adjusted by adjusting a count, a position, a size, and/or a shape of at least one of the sound hole 1421 and/or the relief hole 1422. For example, a damping structure (e.g., a tuning net) may be disposed at the sound hole 1421 to implement an acoustic effect of the air-conduction acoustic assembly.

Figure 15:
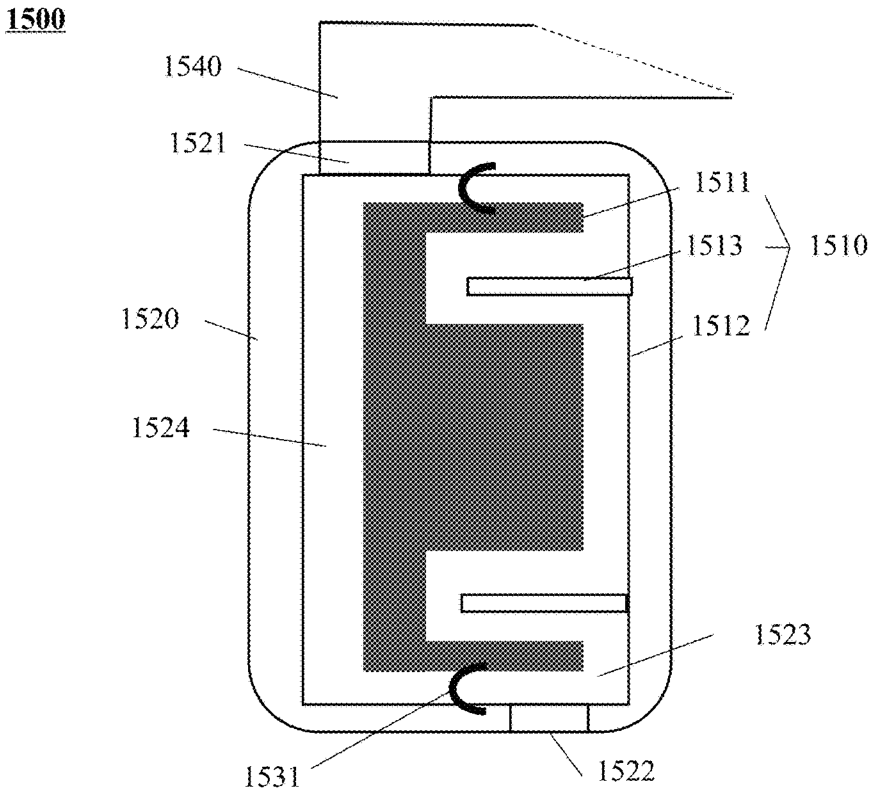
FIG. 15 is a schematic diagram illustrating an acoustic output apparatus according to some embodiments of the present disclosure.

FIG. 15 is a schematic diagram illustrating an acoustic output apparatus according to some embodiments of the present disclosure. The acoustic output apparatus 1500 may be the same as or similar to the acoustic output apparatus 1400 in FIG. 14. For example, the acoustic output apparatus 1500 may include a bone-conduction acoustic assembly 1510, a housing 1520, and an air-conduction acoustic assembly. The bone-conduction acoustic assembly 1510 and the air-conduction acoustic assembly may be accommodated in the housing 1520. The air-conduction acoustic assembly may include a diaphragm 1531 connected to the housing 1520 and/or the bone-conduction acoustic assembly 1510. As another example, a sound hole 1521 and a sound guide channel 1540 may be disposed on a side wall of the housing 1520. The sound hole 1521 and the sound guide channel 1540 may be in flow communication with a second cavity 1524. As another example, a relief hole 1522 may be disposed on the side wall of the housing 1520.

As shown in FIG. 15, different from the acoustic output apparatus 1400, the diaphragm 1531 may surround the bone-conduction acoustic assembly 1510 (e.g., a magnetic circuit assembly of the bone-conduction acoustic assembly 1510). The diaphragm 1531 may be a plate or a sheet having a shape of a ring. In some embodiments, the diaphragm 1531 may be concave or convex to increase elasticity of the diaphragm 1531 and improve a frequency response in a mid-low frequency range. For example, an inner side of the diaphragm 1531 may be physically connected to an outer wall of the bone-conduction acoustic assembly 1510, and an outer side of the diaphragm 1531 may be physically connected to an inner wall of the housing 1520. By surrounding the bone-conduction acoustic assembly 1510, a space occupied by the diaphragm 1531 may be reduced, thereby reducing a volume of the acoustic output apparatus 1500. By reducing the volume and adjusting a position of the diaphragm 1531 in the housing 1520, the volume and/or weight of the acoustic output apparatus 1500 may be effectively reduced.

Figure 16:
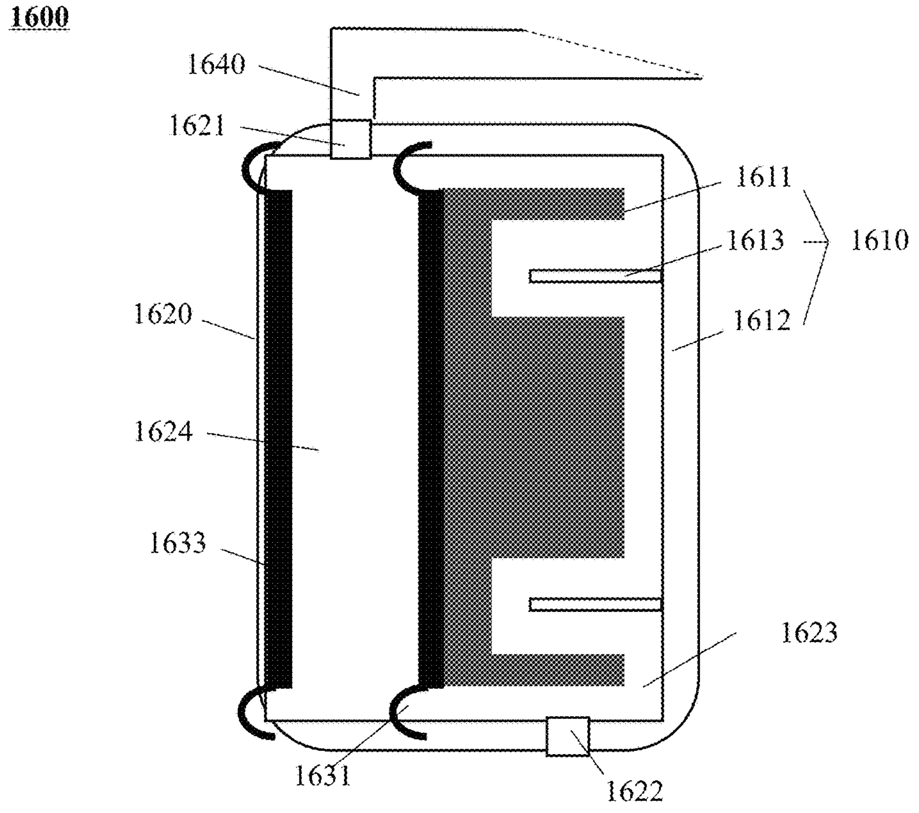
FIG. 16 is a schematic diagram illustrating an acoustic output apparatus according to some embodiments of the present disclosure.

FIG. 16 is a schematic diagram illustrating an acoustic output apparatus according to some embodiments of the present disclosure. In some embodiments, the acoustic output apparatus 1600 may be the same as or similar to the acoustic output apparatus 1400 in FIG. 14. In some embodiments, as shown in FIG. 16, the air-conduction acoustic assembly may include at least two diaphragms, such as a first diaphragm 1631 and a second diaphragm 1633. The first diaphragm and/or the second diaphragm may be the same as or similar to the diaphragm 13. In some embodiments, the first diaphragm 1631 and the second diaphragm 1633 may be arranged approximately in parallel. The first diaphragm 1631 may be connected to the bone-conduction acoustic assembly 1610 and/or the housing 1620, and the second diaphragm 1633 may be connected to the housing 1620 such that the first diaphragm may receive vibrations from the bone-conduction acoustic assembly 1610 and/or the housing 1620, and the second diaphragm may receive vibrations from the housing 1620.

In some embodiments, the second diaphragm 1633 may be disposed between a bottom surface of the housing 1620 and a bottom surface of the bone-conduction acoustic assembly 1610. In some embodiments, the second diaphragm 1633 may be disposed between the bottom surface of the housing 1620 and a plane where the sound hole 1621 is located in a direction parallel to the first diaphragm 1631. In some embodiments, the second diaphragm 1633 may be disposed near or on the bottom surface of the housing 1620. The second diaphragm 1633 may be physically connected to the housing 1620.

In some embodiments, the second diaphragm 1633 may include a main part and an auxiliary part. The main part may be close to or physically connected to the bottom surface of the housing 1620, and the auxiliary part may be ring-shaped and surround the main part. In some embodiments, the second diaphragm 1633 may be the same as or similar to the diaphragm 13 in the above embodiments. For example, the main part may be the same as or similar to the first connection part 132 of the diaphragm 13, and the auxiliary part may be the same or similar to the wrinkle part 133 and the second connection part 134 of the diaphragm 13. In some embodiments, the auxiliary part may also be physically connected to the housing 1620. In some embodiments, the main part may include a mass block, and the auxiliary part may include a spring.

In some embodiments, a resonance frequency of the bottom surface of the housing 1620 may be determined based on a material of the bottom surface of the housing 1620. In some embodiments, the material and thickness of the bottom surface of the housing 1620 may affect the resonance frequency of the bottom surface of housing 1620. For example, if the material of the bottom surface of the housing 1620 is relatively soft, the resonance frequency of the bottom surface of the housing 1620 may be relatively low. On the contrary, if the material of the bottom surface of the housing 1620 is relatively hard, the resonance frequency of the bottom surface of the housing 1620 may be relatively high. In some embodiments, the resonance frequency of the bottom surface of the housing 1620 may be equal to or lower than a threshold, e.g., less than or equal to 10 kHz, or less than or equal to 5 kHz, or less than or equal to 1 kHz, etc. by adjusting the hardness of the material of the bottom surface of the housing 1620.

In some embodiments, the resonance frequency of the bottom surface of the housing 1620 may be determined based on the second diaphragm 1633. For example, the resonance frequency of the bottom surface of the housing 1620 may be equal to the resonance frequency of the second diaphragm 1633.

In some embodiments, the resonance frequency of the second diaphragm 1633 may exceed a vibration frequency of a structure including the bone-conduction acoustic assembly 1610 and the first diaphragm 1631. When the vibration frequency of the bone-conduction acoustic assembly 1610 is less than the resonance frequency of the second diaphragm 1633, the vibration of the second diaphragm 1633 may be consistent with the vibration of the housing 1620. In other words, a vibration phase and a frequency of the second diaphragm 1633 may be consistent with a vibration phase and a frequency of the housing 1620, respectively. The vibration of the second diaphragm 1633 may be opposite to the vibration of the first diaphragm 1631. When the frequency of the structure including the bone-conduction acoustic assembly 1610 and the first diaphragm 1631 is less than the resonance frequency of the second diaphragm 1633, the air in the second cavity 1624 may be compressed or expanded, and the air-conduction sound waves may be formed due to compression or expansion of the air in the second cavity 1624. In some embodiments, when an upper surface of the housing 1620 where the vibration plate 1612 is located vibrates and presses the face due to the vibration of the vibration plate 1612, sound leakage may be generated by the upper surface of the housing 1620. A phase of the sound leakage generated by the upper surface of the housing 1620 may be opposite to a phase of the sound leakage generated by the vibration of the second diaphragm 1633. The sound leakage generated by the vibration of the second diaphragm 1633 and the sound leakage generated by the upper surface of the housing 1620 may cancel each other such that the sound leakage of the acoustic output apparatus 1600 may be suppressed or reduced. In some embodiments, when the vibration frequency of the bone-conduction acoustic assembly 1610 is greater than the resonance frequency of the second diaphragm, a vibration amplitude of the second diaphragm 1633 relative to the housing 1620 may be very small, a vibration amplitude of the air compressed by the second diaphragm 1633 may be very small, and thus the sound leakage produced by the second diaphragm 1633 may also be very small.

Figure 17:
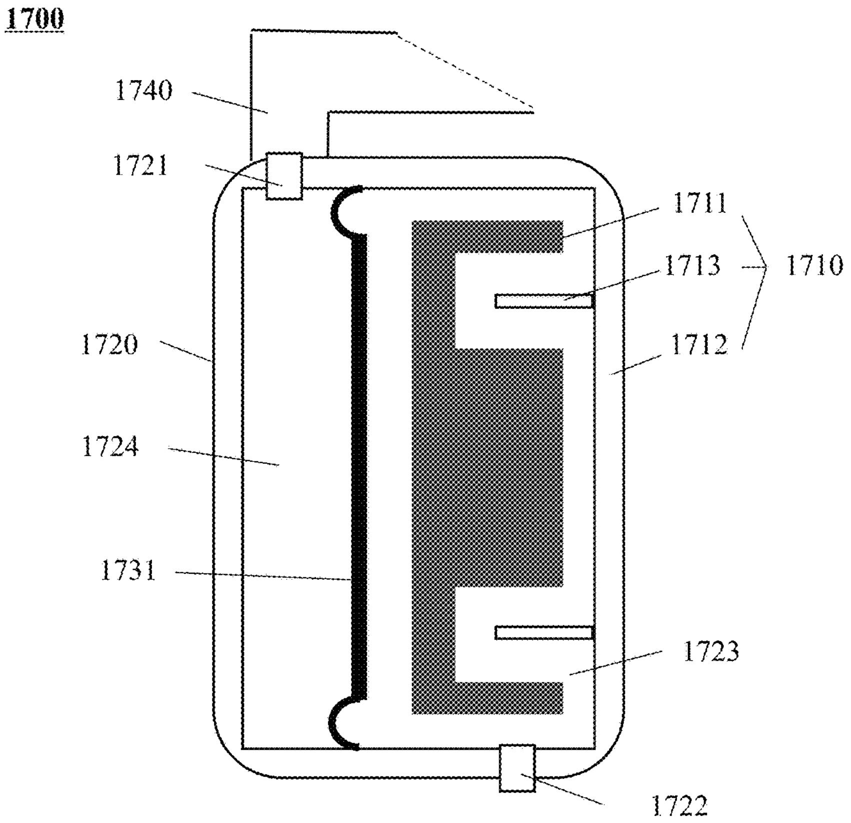
FIG. 17 is a schematic diagram illustrating an acoustic output apparatus according to some embodiments of the present disclosure.

FIG. 17 is a schematic diagram illustrating an acoustic output apparatus according to some embodiments of the present disclosure. An acoustic output apparatus 1700 may be the same as or similar to the acoustic output apparatus 1400 in FIG. 14. As shown in FIG. 17, different from the acoustic output apparatus 1400, a diaphragm 1731 may be separated from a bone-conduction acoustic assembly 1710, and the diaphragm 1731 may be physically connected to a housing 1720. When the bone-conduction acoustic assembly 1710 generates bone-conduction sound waves, vibrations of the bone-conduction acoustic assembly 1710 may cause the housing 1720 to vibrate, thereby driving the diaphragm 1731 to vibrate. When the diaphragm 1731 has a relatively small resonance peak (e.g., the diaphragm 1731 is made of a soft material, or the diaphragm 1731 has a "wrinkle" structure configured to reduce a stiffness of the diaphragm 1731), the diaphragm 1731 may have a better response to low-frequency vibrations generated by the housing 1720. In other words, the diaphragm 1731 may provide lower frequency sound, thereby increasing volume of the air-conduction sound waves in low frequency.

Figure 18:
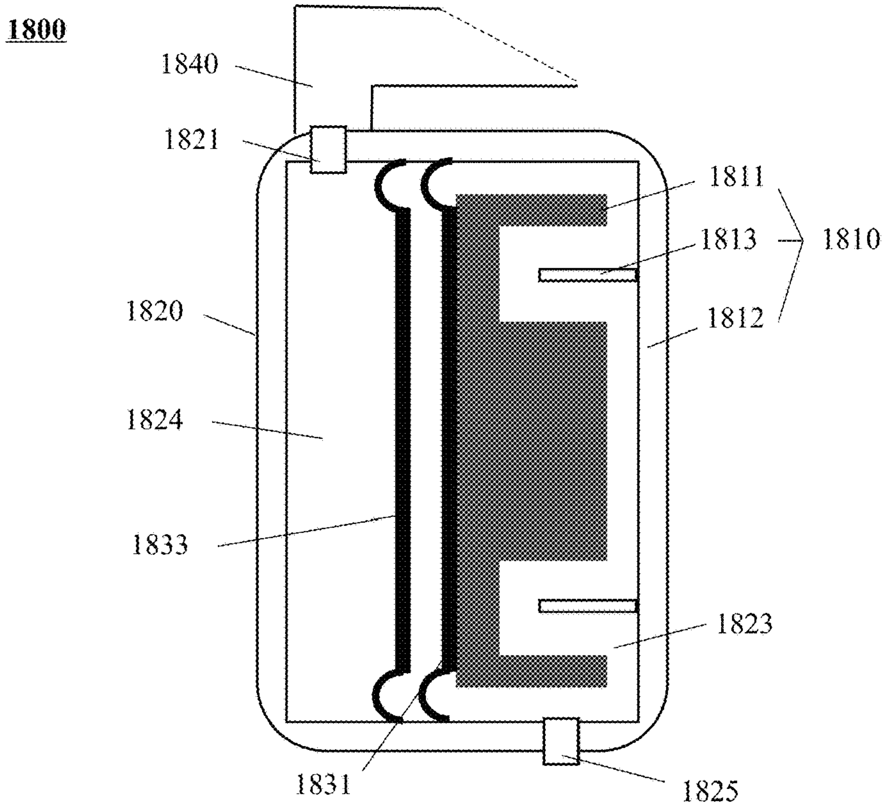
FIG. 18 is a schematic diagram illustrating an acoustic output apparatus according to some embodiments of the present disclosure.

FIG. 18 is a schematic diagram illustrating an acoustic output apparatus according to some embodiments of the present disclosure. In some embodiments, an acoustic output apparatus 1800 may be the same as or similar to the acoustic output apparatus 1600 in FIG. 16. As shown in FIG. 18, different from the acoustic output apparatus 1600, a second diaphragm 1833 may be disposed in a second cavity 1824 separated from a bottom surface of a housing 1820. In some embodiments, the second diaphragm 1833 may be disposed between a first diaphragm 1831 and a plane where a sound hole 1821 is located in a direction parallel to the first diaphragm 1831. In some embodiments, the second diaphragm 1833 may be parallel to the first diaphragm 1831. In some embodiments, the second diaphragm 1833 may be inclined relative to the first diaphragm 1831.

In some embodiments, the second diaphragm 1833 may separate the second cavity 1824 into a first sub-cavity and a second sub-cavity. The first sub-cavity may be defined by the second diaphragm 1833 and the first diaphragm 1831, and the second sub-cavity may be defined by the second diaphragm 1833 and a bottom surface of the housing 1820.

In some embodiments, since a bone-conduction acoustic assembly 1810 and the first diaphragm 1831 may be relatively fixed, vibrations of the housing 1820 caused by vibrations of the bone-conduction acoustic assembly 1810 may cause a change of pressure in the first sub-cavity between the first diaphragm 1831 and the second diaphragm 1833. The change of pressure in the first sub-cavity may cause the air in the first sub-cavity to vibrate. Air vibrations in the first sub-cavity may cause the second diaphragm 1833 to vibrate. The vibrations of the second diaphragm 1833 may cause the air in the second sub-cavity to vibrate, and the vibrations of the housing 1820 may also cause the air in the second sub-cavity to vibrate. A phase of the air vibrations caused by the vibrations of the second diaphragm 1833 and a phase of the air vibrations caused by the vibration of the housing 1820 may be the same such that volume of air-conduction sound waves guided by a sound hole 1821 may be increased.

In some embodiments, the vibrations of the housing 1820 caused by the vibrations of the bone-conduction acoustic assembly 1810 may drive the first diaphragm 1831 to vibrate. The vibrations of the first diaphragm 1831 and/or the housing 1820 may facilitate the vibrations of the air between the first diaphragm 1831 and the second diaphragm 1833. The vibrations of the air between the first diaphragm 1831 and the second diaphragm 1833 and the vibrations of the housing 1820 may drive the second diaphragm 1833 to vibrate. When the second diaphragm 1833 has a relatively small resonance peak (e.g., the second diaphragm 1833 is made of a soft material, or the second diaphragm 1833 has a "wrinkle" structure configured to reduce a stiffness of the second diaphragm 1833), the second diaphragm 1833 may have a better response to the vibrations of the air between the first diaphragm 1831 and the second diaphragm 1833 caused by low-frequency vibrations generated by the bone-conduction acoustic assembly 1810. In other words, the second diaphragm 1833 may provide more low-frequency sound, thereby increasing the volume of low-frequency air-conduction sound waves. The acoustic output apparatus 1800 may provide rich sound (e.g., more low-frequency sound), which may increase the volume of the air-conduction sound waves.

Figure 19:
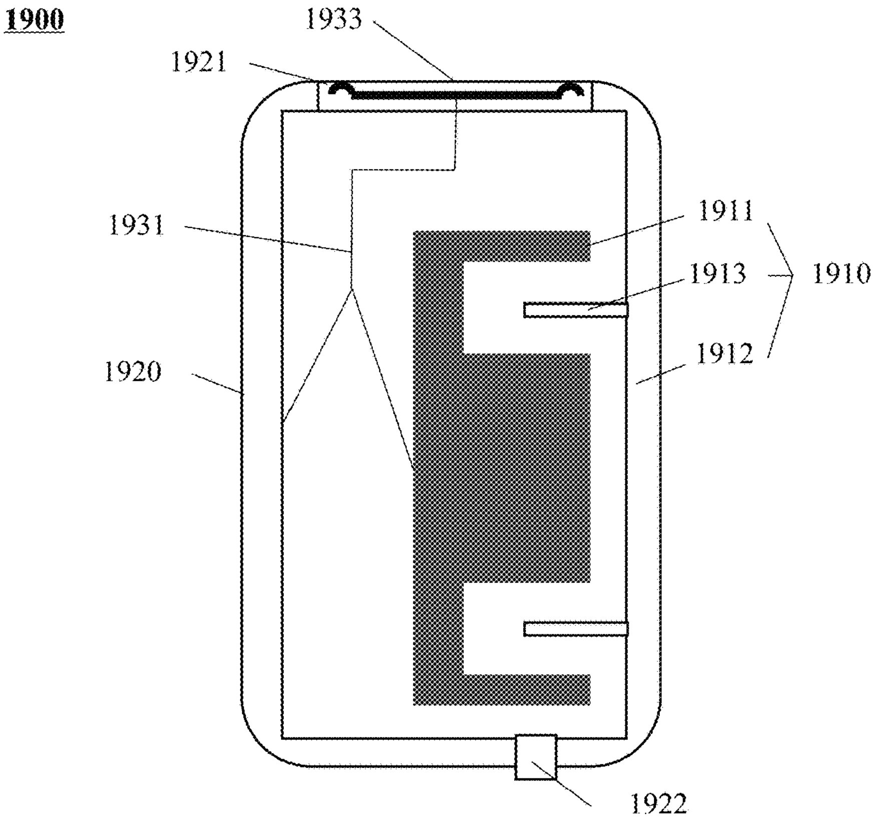
FIG. 19 is a schematic diagram illustrating an acoustic output apparatus according to some embodiments of the present disclosure.

FIG. 19 is a schematic diagram illustrating an acoustic output apparatus according to some embodiments of the present disclosure. In some embodiments, an acoustic output apparatus 1900 may be the same as or similar to the acoustic output apparatus 1400 in FIG. 14. As shown in FIG. 19, different from the acoustic output apparatus 1400, an air-conduction acoustic assembly may include a diaphragm 1933 and a vibration transmission component 1931. The vibration transmission component 1931 may be physically connected to a bone-conduction acoustic assembly 1910, the diaphragm 1933, and/or a housing 1920. The vibration transmission component 1931 may be configured to transmit vibrations of the bone-conduction acoustic assembly 1910 and/or the housing 1920 to the diaphragm 1933 to generate air-conduction sound waves. During a vibration transmission, the vibration transmission component 1931 may change a vibration direction of the bone-conduction acoustic assembly 1910 and/or the housing 1920. In other words, the vibration direction of the diaphragm 1933 may be different from the vibration direction of the bone-conduction acoustic assembly 1910 and/or the housing 1920.

In some embodiments, the diaphragm 1933 may be located at a sound hole 1921. The diaphragm 1933 may be connected to the bone-conduction acoustic assembly 1910 through the vibration transmission component 1931. The bone-conduction acoustic assembly 1910 may be connected to the housing 1920 through the vibration transmission component 1931. In some embodiments, the vibration transmission component 1931 may include a plurality of connecting rods. In some embodiments, one of the plurality of connecting rods may be physically connected to the diaphragm 1933, and one of the plurality of connecting rods may be physically connected to the bone-conduction acoustic assembly 1910. In some embodiments, one of the plurality of connecting rods may be physically connected to housing 1920.

In some embodiments, the plurality of connecting rods may be physically connected to each other.

In some embodiments, when transmitting the vibrations of the housing 1920 and/or the bone-conduction acoustic assembly 1910, the vibration transmission component 1931 may change a vibration direction of the vibrations, and transmit the vibrations of the housing 1920 with changed vibration direction to the diaphragm 1933. As shown in FIG. 19, the housing 1920 may vibrate in a left-and-right direction relative to the bone-conduction acoustic assembly 1910, thereby generating bone-conduction sound waves. The housing 1920 may transmit the vibrations of the bone-conduction acoustic assembly 1910 to the cochleae through an upper surface of the housing 1920 via human bones. The vibration transmission component 1931 may convert the left-and-right direction of the housing 1920 into up-and-down vibrations, and transmit the vibrations to the diaphragm 1933 such that the diaphragm 1933 may vibrate up and down to generate the air-conduction sound waves. In some embodiments, the sound hole 1921 may directly face the human ears, i.e., the diaphragm 1933 may vibrate towards the human ears.

Figure 20:
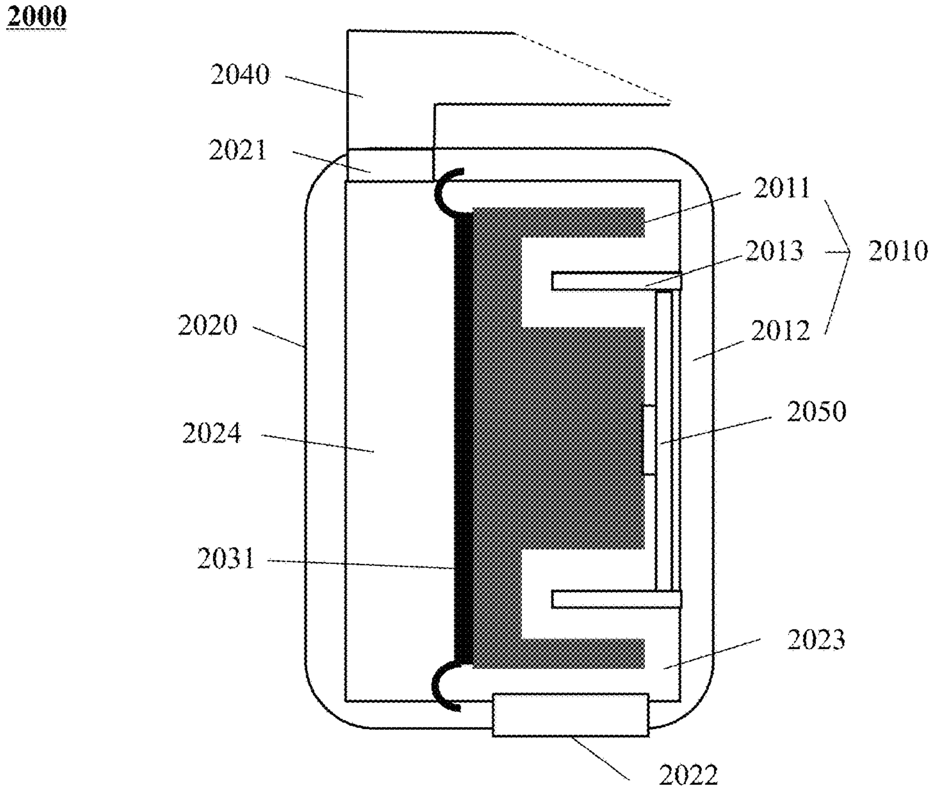
FIG. 20 is a schematic diagram illustrating an acoustic output apparatus according to some embodiments of the present disclosure.

FIG. 20 is a schematic diagram illustrating an acoustic output apparatus according to some embodiments of the present disclosure. In some embodiments, an acoustic output apparatus 2000 may be the same as or similar to the acoustic output apparatus 1400 in FIG. 14. As shown in FIG. 20, different from the acoustic output apparatus 1400, the acoustic output apparatus 2000 may further include an elastic member 2050 disposed between a bone-conduction acoustic assembly 2010 and a housing 2020. In some embodiments, the elastic member 2050 may be located in a first cavity 2023, and the elastic member 2050 may be physically connected to the bone-conduction acoustic assembly 2010 (e.g., a magnetic circuit assembly 2011) and the housing 2020. In some embodiments, the elastic member 2050 may fix the magnetic circuit assembly 2011 more effectively and prevent the magnetic circuit assembly 2011 from turning over when the housing 2020 vibrates, thereby improving a sound quality of the acoustic output apparatus 2000.

In some embodiments, the elastic member 2050 may have a specific resonance frequency, and the resonance frequency may provide a resonance peak for vibrations of the housing 2020. In such cases, bone-conduction sound waves generated by the bone-conduction acoustic assembly 2010 may have a higher volume near the resonance peak of the elastic member 2050. In some embodiments, output characteristics of the bone-conduction sound waves may be adjusted by adjusting one or more characteristics (e.g., a size, elastic modulus of a material, etc.) of a diaphragm 2031 and an elastic coefficient of the elastic member 2050. It should be noted that the elastic member 2050 in this embodiment is not limited to the scope of the present disclosure, and can also be applied to the acoustic output apparatus in other figures of the present disclosure.

The possible beneficial effects of the embodiments of the present disclosure may include, but are not limited to: (1) the diaphragm disposed between the transducer and the housing may cause the acoustic output apparatus to generate bone-conduction sound and air-conduction sound, thereby improving the acoustic performance of the acoustic output apparatus; (2) the wrinkle part on the diaphragm may improve deformation capacity of the diaphragm in the vibration direction of the transducer, thereby reducing the influence of the diaphragm on the vibrations of the transducer; (3) the reinforcing member having greater stiffness than the diaphragm may be disposed on the edge of the diaphragm such that the diaphragm may be connected to the housing through the reinforcing member, thereby increasing the reliability of the connection between the diaphragm and the reinforcing member; and (4) the two ends of the transducer are respectively connected to the housing through the spring sheet and the diaphragm, which may increase the stability of the transducer.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These modifications, improvements, and amendments are intended to be suggested by the present disclosure, and are within the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about," "approximately" or "substantially" in some examples. Unless otherwise stated, "about," "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic output apparatus, comprising:
- a bone-conduction acoustic assembly configured to generate bone-conduction sound waves;
- an air-conduction acoustic assembly configured to generate air-conduction sound waves; and
- a housing including an accommodating chamber configured to accommodate the bone-conduction acoustic assembly and the air-conduction acoustic assembly, wherein
  - at least a portion of the housing is in contact with a user's skin to transmit the bone-conduction sound waves under an action of the bone-conduction acoustic assembly; and
  - the air-conduction sound waves are generated based on vibrations of at least one of the housing or the bone-conduction acoustic assembly when the bone-conduction sound waves are generated;
  - the air-conduction acoustic assembly includes a diaphragm connected to at least one of the bone-conduction acoustic assembly or the housing, and the vibrations of the at least one of the bone-conduction acoustic assembly or the housing drive the diaphragm to generate the air-conduction sound waves;
  - the diaphragm includes a first connection part surrounding the bone-conduction acoustic assembly and connected to the bone-conduction acoustic assembly, a second connection part connected to the housing, and a wrinkle part connecting the first connection part and the second connection part.

2. The acoustic output apparatus of claim 1, wherein the bone-conduction acoustic assembly includes a transducer device, and the transducer device includes:
- a magnetic circuit assembly configured to generate a magnetic field;
- a vibration plate connected to the housing; and
- a voice coil connected to the vibration plate, wherein the voice coil vibrates in the magnetic field in response to a sound signal, and drives the vibration plate to vibrate to generate the bone-conduction sound waves.

3. The acoustic output apparatus of claim 2, wherein the air-conduction acoustic assembly further includes a reinforcing member, and the second connection part is connected to the housing through the reinforcing member.

4. The acoustic output apparatus of claim 3, wherein the magnetic circuit assembly includes a magnetic conduction cover and a magnet disposed inside the magnetic conduction cover, and the first connection part is injection-molded on an outer peripheral surface of the magnetic conduction cover, wherein the bone-conduction acoustic assembly further includes:
- a voice coil support connected to the housing, wherein the voice coil is connected to the voice coil support, and the voice coil extends into a magnetic gap between the magnet and the magnetic conduction cover; and
- an elastic member, wherein a central region of the elastic member is connected to the magnet, and a peripheral region of the elastic member is connected to the voice coil support such that the magnetic circuit assembly is suspended in the housing.

5. The acoustic output apparatus of claim 4, wherein the voice coil support includes:
- a main body connected to the peripheral region of the elastic member;
- a first bracket, one end of the first bracket being connected to the main body, and the other end of the first bracket being connected to the voice coil; and
- a second bracket, one end of the second bracket being connected to the main body, and the other end of the second bracket pressing the reinforcing member on a platform of the housing.

6. The acoustic output apparatus of claim 4, wherein there is a first distance from a connection point between the wrinkle part and the first connection part to a bottom surface of the bone-conduction acoustic assembly, there is a second distance from the central region of the elastic member to the bottom surface of the bone-conduction acoustic assembly, and a ratio of the first distance to the second distance is in a range of 0.3-0.8.

7. The acoustic output apparatus of claim 6, wherein there is a third distance from a center of gravity of the magnet to the bottom surface of the bone-conduction acoustic assembly, and a ratio of the first distance to the third distance is in a range of 0.7-2.

8. The acoustic output apparatus of claim 7, wherein the first distance is greater than the third distance.

9. The acoustic output apparatus of claim 6, wherein
- the accommodating chamber includes a first cavity and a second cavity separated by the diaphragm;
- a first portion of the housing forms the first cavity and is connected to the bone-conduction acoustic assembly to transmit the bone-conduction sound waves;
- a second portion of the housing forms the second cavity and includes one or more sound holes in communication with the second cavity, and the air-conduction sound waves are guided out from the housing through the one or more sound holes; and
- at least a portion of the one or more sound holes are located between the connection point and the bottom surface of the bone-conduction acoustic assembly.

10. The acoustic output apparatus of claim 3, wherein the reinforcing member includes a reinforcing ring, and the second connection part is connected to an inner ring surface of the reinforcing ring and an end surface of the reinforcing ring.

11. The acoustic output apparatus of claim 1, wherein the accommodating chamber includes a first cavity and a second cavity separated by the diaphragm, wherein
- a first portion of the housing forms the first cavity and is connected to the bone-conduction acoustic assembly to transmit the bone-conduction sound waves; and
- a second portion of the housing forms the second cavity and includes one or more sound holes in communication with the second cavity, and the air-conduction sound waves are guided out from the housing through the one or more sound holes.

12. The acoustic output apparatus of claim 1, wherein a frequency response curve of the bone-conduction sound waves includes at least one resonance peak,
- the at least one resonance peak has a first resonance frequency when the diaphragm is connected to the bone-conduction acoustic assembly and the housing,
- the at least one resonance peak has a second resonance frequency when the diaphragm is disconnected from the at least one of the bone-conduction acoustic assembly or the housing, and
- a ratio of an absolute value of a difference between the first resonance frequency and the second resonance frequency to the first resonance frequency is less than or equal to 50%.

13. The acoustic output apparatus of claim 1, wherein the accommodating chamber includes a first cavity and a second cavity separated by the diaphragm, the wrinkle part includes at least one of a convex region or a concave region, the concave region being concave towards the second cavity.

14. The acoustic output apparatus of claim 13, wherein the concave region has a first depth,
- a first spacing distance is between the first connection part and the second connection part, and
- a ratio of the first depth to the first spacing distance is in a range of 0.2-1.4.

15. The acoustic output apparatus of claim 14, wherein the concave region has a half-depth width at a half-depth of the first depth, and a ratio of the half-depth width to the first spacing distance is in a range of 0.2-0.6.

16. The acoustic output apparatus of claim 14, wherein there is a first projection distance between a first connection point and a second connection point along a vibration direction of the bone-conduction acoustic assembly, the first connection point being a connection point between the wrinkle part and the first connection part, the second connection point being a connection point between the wrinkle part and the second connection part, and
- a ratio of the first projection distance to the first spacing distance is in a range of 0-1.8.

17. The acoustic output apparatus of claim 13, wherein the wrinkle part includes:
- a first transition segment, one end of the first transition segment being connected to the first connection part;
- a second transition segment, one end of the second transition segment being connected to the second connection part;
- a third transition segment, one end of the third transition segment being connected to the other end of the first transition segment;
- a fourth transition segment, one end of the fourth transition segment being connected to the other end of the second transition segment; and
- a fifth transition segment, two ends of the fifth transition segment being connected to the other end of the third transition segment and the other end of the fourth transition segment, respectively, wherein
  - in a direction from a connection point between the first transition segment and the first connection part to a vertex of the wrinkle part, an included angle between a tangent line of a side of the first transition segment facing the concave region and the vibration direction of the bone-conduction acoustic assembly decreases gradually, and an included angle between a tangent line of a side of the third transition segment facing the concave region and the vibration direction of the bone-conduction acoustic assembly remains constant or increases gradually; and
  - in a direction from a connection point between the second transition segment and the second connection part to the vertex, an included angle between a tangent line of a side of the second transition segment facing the concave region and the vibration direction of the bone-conduction acoustic assembly decreases gradually, and an included angle between a tangent line of a side of the fourth transition segment facing the concave region and the vibration direction of the bone-conduction acoustic assembly remains constant or increases gradually.

18. The acoustic output apparatus of claim 17, wherein in a direction perpendicular to the vibration direction of the bone-conduction acoustic assembly, the first transition segment, the second transition segment, and the fifth transition segment have a first projection length, a second projection length, and a third projection length, respectively, and
- a ratio of a sum of the first projection length and the second projection length to the third projection length is in a range of 0.4-2.5.

19. The acoustic output apparatus of claim 1, wherein a thickness of the diaphragm is less than or equal to 0.2 mm.

20. The acoustic output apparatus of claim 1, wherein the diaphragm includes an annular structure, an inner wall of the diaphragm surrounds the bone-conduction acoustic assembly, and an outer wall of the diaphragm is connected to the housing.

* * * * *